(12) United States Patent
Biagiotti et al.

(10) Patent No.: US 7,978,218 B2
(45) Date of Patent: **\*Jul. 12, 2011**

(54) SINGLE INSTRUMENT/CARD FOR VIDEO APPLICATIONS

(75) Inventors: William Biagiotti, St. James, NY (US); David Howell, Smithfield, VA (US); Peter F. Britch, Miller Place, NY (US)

(73) Assignee: Advanced Testing Technologies Inc., Hauppauge, NY (US)

( \* ) Notice: Subject to any disclaimer, the term of this patent is extended or adjusted under 35 U.S.C. 154(b) by 1310 days.

This patent is subject to a terminal disclaimer.

(21) Appl. No.: 11/545,327

(22) Filed: Oct. 10, 2006

(65) Prior Publication Data

US 2007/0064110 A1   Mar. 22, 2007

Related U.S. Application Data

(63) Continuation-in-part of application No. 10/155,368, filed on May 24, 2002, now Pat. No. 7,253,792, which is a continuation-in-part of application No. 09/321,041, filed on May 27, 1999, now Pat. No. 6,396,536, application No. 11/545,327, which is a continuation-in-part of application No. 10/985,152, filed on Nov. 10, 2004, now Pat. No. 7,495,674, which is a continuation-in-part of application No. 10/155,368, which is a continuation-in-part of application No. 09/321,041.

(60) Provisional application No. 60/086,934, filed on May 27, 1998.

(51) Int. Cl.
*H04N 17/00* (2006.01)

(52) U.S. Cl. ......... 348/180; 348/181; 348/184; 345/629

(58) Field of Classification Search .................. 348/184, 348/180–182, 189, 177, 552–553, 725; 345/629, 345/16; H04N 17/00
See application file for complete search history.

(56) References Cited

U.S. PATENT DOCUMENTS

| | | | |
|---|---|---|---|
| 4,336,476 A | 6/1982 | Holland et al. | |
| 4,338,673 A | 7/1982 | Brown | |
| 4,466,014 A * | 8/1984 | Wilensky et al. | ............. 348/183 |
| 4,513,318 A | 4/1985 | Wilensky et al. | |
| 4,554,636 A | 11/1985 | Maggi et al. | |
| 4,554,663 A | 11/1985 | Pham van Cang | |
| 4,631,532 A | 12/1986 | Grothe | |
| 4,635,050 A | 1/1987 | Grothe et al. | |
| 4,635,096 A | 1/1987 | Morgan | |
| 4,718,018 A | 1/1988 | Sloane et al. | |
| 4,736,330 A | 4/1988 | Capowski | |
| 4,754,334 A | 6/1988 | Kriz et al. | |
| 4,812,713 A | 3/1989 | Blanchard | |
| 4,847,603 A | 7/1989 | Blanchard | |
| 4,974,080 A | 11/1990 | Fritchie et al. | |
| 5,003,393 A | 3/1991 | Riegel | |
| 5,055,928 A | 10/1991 | Klingelhofer | |
| 5,122,863 A | 6/1992 | Zortea | |
| 5,274,445 A | 12/1993 | Overton et al. | |

(Continued)

*Primary Examiner* — Trang U Tran
(74) *Attorney, Agent, or Firm* — Brian Roffe

(57) ABSTRACT

Video processing arrangement including a host computer having a monitor, a video asset coupled to the computer for generating video signals and an interface for connecting the video asset to the computer to enable the display of video signals on the monitor. The video asset includes various primary elements including a primary composite video module for producing different types of a primary video signal and outputting the primary video signal via output channels, a stroke generator module for generating a stroke XYZ video signal and outputting the stroke video signal via output channels and a real time capture module for capturing video signals in a plurality of different modes. The video asset also includes a common distributed time base module for generating and distributing clock signals to all of the primary elements.

39 Claims, 17 Drawing Sheets

GENERAL ARRANGEMENT

U.S. PATENT DOCUMENTS

| | | |
|---|---|---|
| 5,319,446 A | 6/1994 | Emmoto et al. |
| 5,521,615 A | 5/1996 | Boyan |
| 5,710,573 A | 1/1998 | Hung et al. |
| 5,781,231 A | 7/1998 | Reynolds |
| 5,790,114 A | 8/1998 | Geaghan et al. |
| 5,842,006 A * | 11/1998 | Harvey et al. ............ 713/502 |
| 5,874,991 A | 2/1999 | Steinberg et al. |
| 5,920,340 A | 7/1999 | Man et al. |
| 5,969,699 A | 10/1999 | Balram et al. |
| 6,396,536 B1 | 5/2002 | Howell et al. |
| 6,985,977 B2 * | 1/2006 | Vrancic ............ 710/59 |
| 7,768,533 B2 * | 8/2010 | Biagiotti et al. ............ 345/629 |

* cited by examiner

GENERAL ARRANGEMENT

75Ω OUTPUT DRIVER

PCV BLOCK DIAGRAM

PCV MEMORY HIERARCHY

FIG. 6 DRAWING ENGINE

DYNAMIC OVERLAY

PIXEL TO COLOR
LOOK UP TABLE
W/SYNC

DEFLECTION WAVEFORM GENERATOR

STROKE GENERATOR BLOCK DIAGRAM

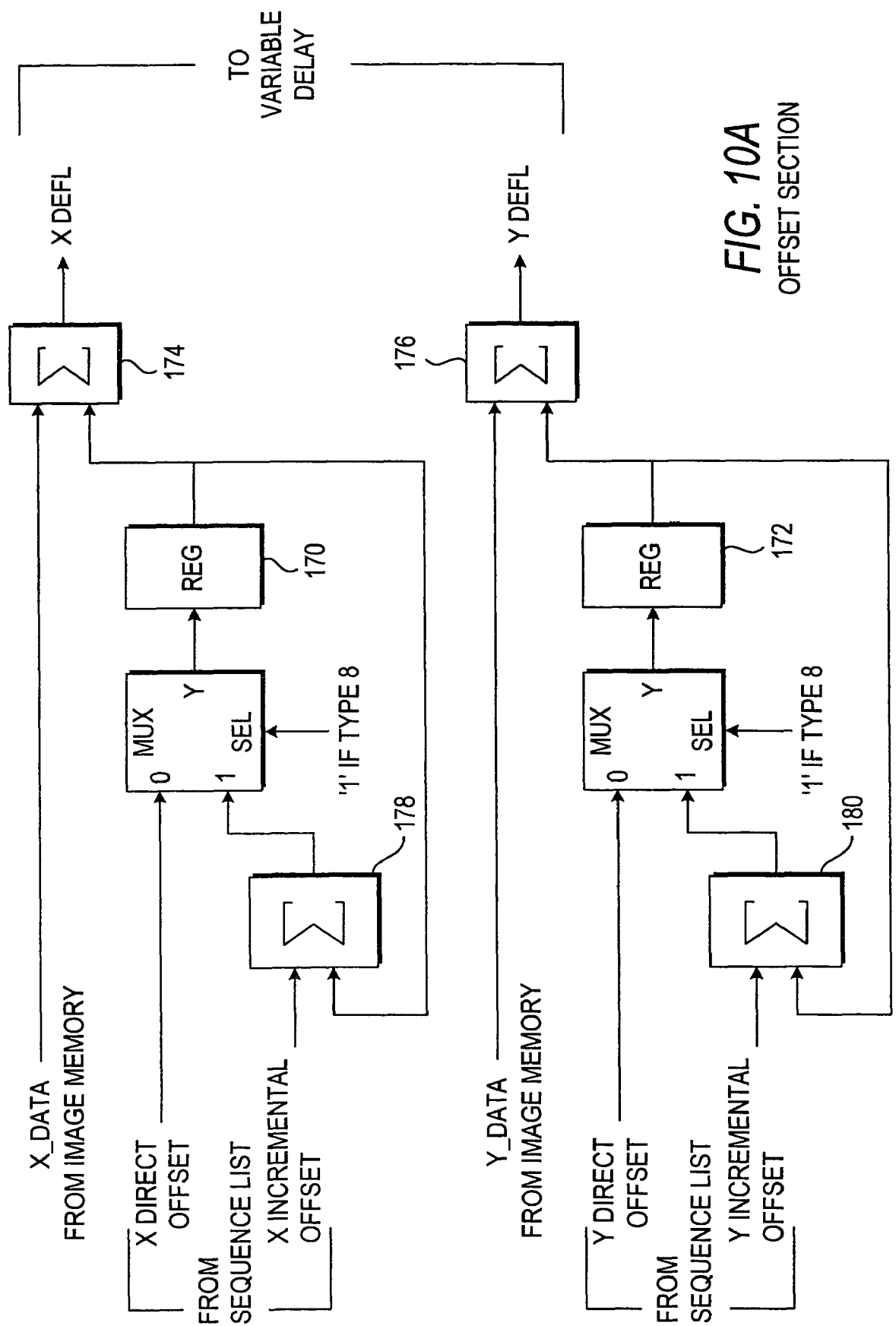
FIG. 10A OFFSET SECTION

3 CHANNEL VARIABLE DELAY

STROKE GENERATOR CONTROL STRUCTURE

SECONDARY VIDEO SOURCE

REAL TIME CAPTURE

IMAGE SYNCHRONIZATION

SINGLE INSTRUMENT/CARD FOR VIDEO APPLICATIONS

CROSS-REFERENCE TO RELATED APPLICATIONS

This application is:

1. a continuation-in-part of U.S. patent application Ser. No. 10/155,368 filed May 24, 2002 now U.S. Pat. No. 7,253,792 which is a continuation-in-part of U.S. patent application Ser. No. 09/321,041 filed May 27, 1999, now U.S. Pat. No. 6,396,536, which claims priority under 35 U.S.C. §119(e) of U.S. provisional patent application Ser. No. 60/086,934 filed May 27, 1998; and 2. a continuation-in-part of U.S. patent application Ser. No. 10/985,152 filed Nov. 10, 2004 now U.S. Pat. No. 7,495,674 which is a continuation-in-part of U.S. patent application Ser. No. 10/155,368 filed May 24, 2002 now U.S. Pat. No. 6,396,536 which is a continuation-in-part of U.S. patent application Ser. No. 09/321,041 filed May 27, 1999, now U.S. Pat. No. 6,396,536, which claims priority under 35 U.S.C. §119(e) of U.S. provisional patent application Ser. No. 60/086,934 filed May 27, 1998.

This application is related to U.S. patent application Ser. No. 11/153,874 filed Jun. 15, 2005 on the grounds that they include common subject matter.

All of these applications are incorporated by reference herein.

FIELD OF THE INVENTION

The present invention relates generally to an instrument or card for use in automatic test instruments.

BACKGROUND OF THE INVENTION

Automatic test equipment for testing standard format video devices is known. However, it is commonly required to evaluate the performance and functionality of a non-standard video unit under test (UUT) to determine if the UUT is operating within the manufacturer's specifications. Specifically, the UUT may require special image and scan formats, voltage levels, and timing signals. In addition, fault simulation may be required to verify the UUT's functionality.

Video signals can be generated by a wide variety of instruments employing diverse methods. In most available types, the image format, sync format and timing are limited to a set of known types primarily to support commercial display devices. Also, any UUT specific timing signals, related to the video signal but not part of it, often must be created by the use of ancillary equipment.

OBJECTS AND SUMMARY OF THE INVENTION

It is an object of the present invention to provide a new and improved system having video generating and processing capabilities on a single instrument intended for use in automatic test equipment.

In order to achieve this objects and others, in accordance with the invention, a Video Asset (AVA) is disclosed and is a VXI register based, single slot "C" size, instrument intended primarily for use in automatic test equipment. The AVA comprises eight major elements as follows, and may even consist of only these elements, or subsets of these elements:

1. Primary Composite Video (PCV);
2. Stroke Generator (SG);
3. Secondary Video Source (SVS);
4. Real Time Capture (RTC);
5. Serial Data Interface (SDI);
6. Distributed Time Base (DTB);
7. VXI Interface; and
8. Software Calculation and Control Module (SCCM).

Accordingly, a first embodiment of a video processing arrangement in accordance with the invention includes a host computer including a monitor, a video asset coupled to the computer for generating video signals and a VXI interface for connecting the video asset to the computer to enable the display of the video signals on the monitor. The video asset includes various primary elements including a primary composite video module for producing different types of a primary video signal and outputting the primary video signal via output channels, a stroke generator module for generating a stroke XYZ video signal and outputting the stroke video signal via output channels and a real time capture module for capturing video signals in a plurality of different modes. The video asset also includes a common distributed time base module for generating and distributing clock signals to all of the primary elements.

The primary elements are autonomous or autonomously operational such that they do not share components with each other, aside from the VXI interface and the distributed time base module, to thereby enable each primary element to act as a stand-alone instrument and all of the primary elements to act simultaneously.

An optional primary element is a secondary video source module for producing a secondary composite video signal and outputting the secondary composite video signal via output channels. The secondary video source module produces the secondary composite video signal in an identical or different format than the primary video signal and different than the primary video signal.

The combination of the above-mentioned four video processing modules comprises the required capability to test a majority of aircraft and other video systems. The video functions provided by the video asset are thus color composite video generation-three channel with analog and digital outputs, raster XYZ video generation, stroke XYZ video generation and video acquisition and re-display with the ability to process color composite video, raster XYZ video and stroke XYZ video.

An advantage of the video asset is its combination of video processing features which enables the fully independent, simultaneous use and operation of all four modules, i.e., all four modules are capable of being operated and functioning to perform their respective function(s) in a completely independent manner. In prior art configurations, the modules which perform the video generation are interlinked so that it is not possible to perform all of the video generating functions of the modules simultaneously, i.e., the video generation modules do not operate autonomously or in an autonomous manner. Thus, the prior art configurations are unable to test complex systems which require testing of multiple video-generating functions simultaneously. For example, if a test required the generation of a mixed video signal (consisting of a composite video signal and a stroke video signal generated simultaneously) and acquisition of another video signal at the same time, the prior art is incapable of performing this type of test.

To allow for the simultaneous use of all four modules, the modules must be arranged with panel connections for each module, i.e., the input and output channels of each module, independent time bases, i.e., the distributed time base module, and appropriate circuitry which would be designable by one skilled in the art.

Another advantage of the arrangement in accordance with the invention is that the required video test capability is always available by virtue of having a single instrument which has the capability to test a wide range of video monitors and generators. This is particularly advantageous for testing automated testing equipment. Cost savings are also provided in light of the possible reuse of individual components, the reduced need to purchase specialized video test equipment (i.e., a plurality of individual systems), the reduced time and expense needed to learn the operation of other video test equipment, the reduced maintenance requirements, and the reduced power consumption. The arrangement can also be made portable providing yet another advantage.

In the arrangement, the distributed time base module includes a single reference frequency generator and a plurality of high-resolution frequency synthesizers, each dedicated to a respective primary element such that each primary element has an independent clock frequency. A serial data interface connects each primary element together and to the VXI interface.

Also disclosed is a method for controlling stroke video generation components which comprises creating a program to command the video generation components to provide video signals and integrating high level software constructs into the program to enable a reduced length program to be provided. Integration of the high level software constructs into the program may entail integrating a GOTO command into the program to enable repetition of a section of the program and repetition of a display sequence provided by implementation of the section of the program, integrating a GOSUB command and a RETURN command into the program to enable multiple use of a single section of the program at different locations within the program, integrating a conditional command into the program to enable a first portion of the program to be implemented when the condition is satisfied and a second portion of the program to be implemented when the condition is not satisfied, and/or integrating a DO-WHILE loop into the program to enable repetition of a section of the program when a condition is satisfied and continuation of the program when the condition is not satisfied. In addition, commands may be integrated into the program specific to the video generation components to control pattern display intensity and incremental pattern offset of the video signal.

The use of high level constructs in a signal generating program provides significant advantages such as a reduction in the effort and time required to create the program and a reduction in required memory allocation to store and run the program.

A method for capturing and automatically formatting video signals in both synchronized and deflection driven forms in accordance with the invention comprises the steps of providing a single real-time capture module including three input channels for receiving the video signals, three analog to digital converters for processing the video signals and three dynamic memories, storing the data from the converters relating to the video signals in the three dynamic memories, generating a line location look-up table during the storage of data in the dynamic memories which holds the starting address of the stored lines of synchronized video, and generating the video signal by addressing the line location look-up table.

The dynamic memory may be configured as an array in which each row corresponds to a single line of synchronized video and each column corresponds to a video sample. In the alternative, the dynamic memory may be configured as an array with an equal number of rows and columns whereby for capture of stroke video, X and Y deflection data is used as row and column addresses and Z intensity is stored at memory elements pointed to by the X and Y deflection data.

Single-channel operation of the real-time capture module is enabled by aligning a first one of the converters with the single operative input channel and adjusting the reference levels of the second and third converters to exhibit the same response as the first converter.

Storing the video signals in the dynamic memories may entail writing data from each converter into a respective first-in-first-out (FIFO) memory, transferring the data from each FIFO memory to a respective one of the dynamic memories until the FIFO memory is almost empty, and then halting the transfer of data from the FIFO memory to the respective dynamic memory, and then restarting the transfer of data from the FIFO memory to the respective dynamic memory when the FIFO memory is almost full.

An arrangement for capturing and automatically formatting video signals in both synchronized and deflection driven forms in accordance with the invention comprises three input channels for receiving the video signals, three analog to digital converters for processing the video signals received by the input channels, three dynamic memories for storing the data from the converters relating to the video signals, and a static RAM for storing a line location look-up table generated during the storage of data in the dynamic memories, the line location look-up table holding starting address of the stored lines of synchronized video. A video signal is generated by addressing the line location look-up table.

The dynamic memories may each be configured as an array in which each row corresponds to a single line of synchronized video and each column corresponds to a video sample, or in the alternative, configured as an array with an equal number of rows and columns whereby for capture of stroke video, X and Y deflection data is used as row and column addresses and Z intensity is stored at memory elements pointed to by the X and Y deflection data.

To enable periodic interruption of data transfer to the dynamic memories and uninterrupted sampling of input signals, three first-in-first-out (FIFO) memories are provided, each interposed between one of the converters and a respective dynamic memory.

An arrangement for generating the line location look-up table may be provided including, for example, a sync stripper for separating composite sync timing from input video, a sync processor for producing a local timing reference from the composite sync timing, a frame limiter for outputting a burst of line start pulses coincident with the video frame and a clock line counter clocked by the line start pulses for controlling the input of data into the line location look-up table.

The invention will be described in detail with reference to some preferred embodiments of the invention illustrated in the figures in the accompanying drawing. However, the invention is not confined to the illustrated and described embodiments alone.

BRIEF DESCRIPTION OF THE DRAWINGS

Additional objects of the invention will be apparent from the following description of the preferred embodiment thereof taken in conjunction with the accompanying non-limiting drawings, in which:

FIG. 10A is a schematic diagram of an offset section of the stroke generator;

DETAILED DESCRIPTION OF THE INVENTION

Figure 1:
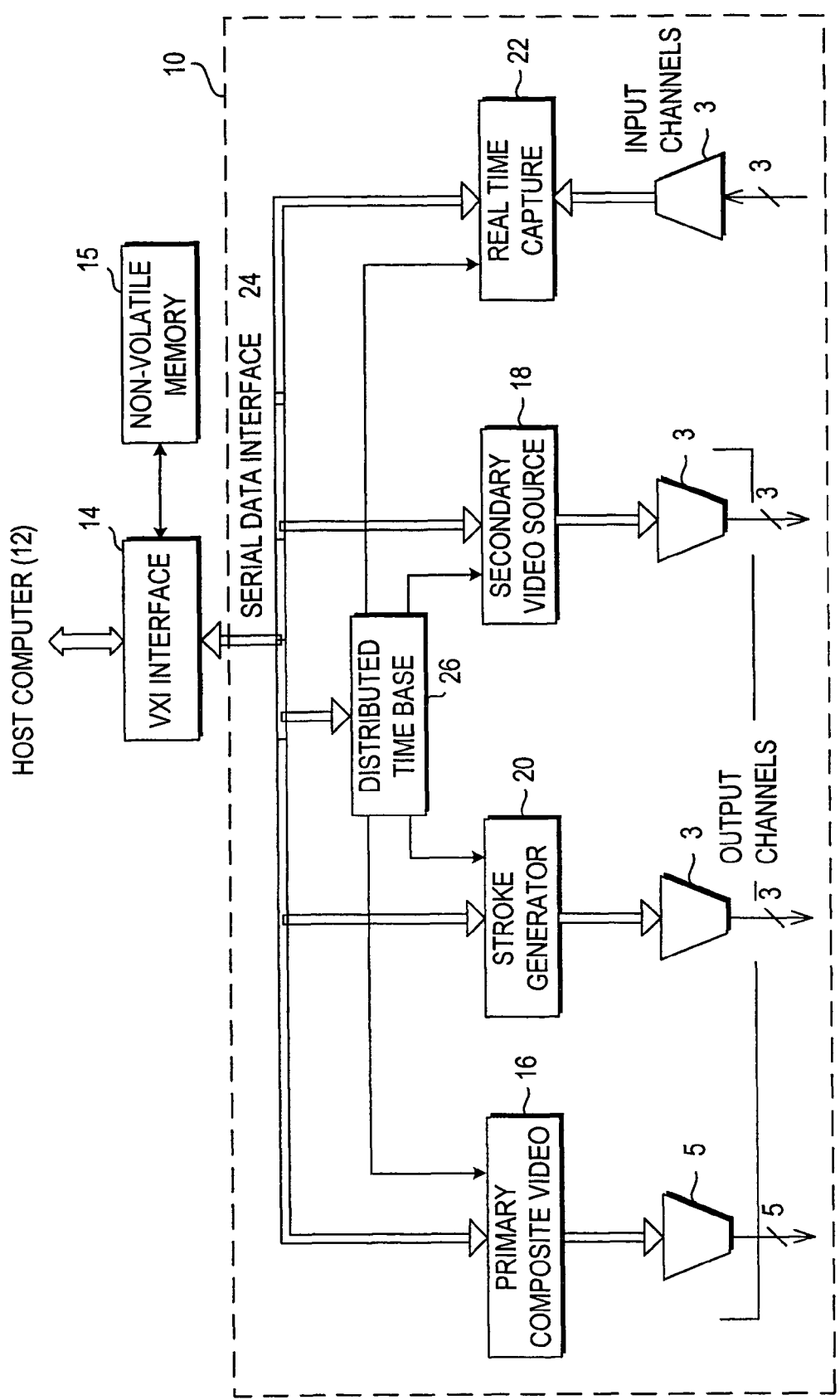
FIG. 1 shows the general arrangement of the video asset in accordance with the invention.
Figure 2:
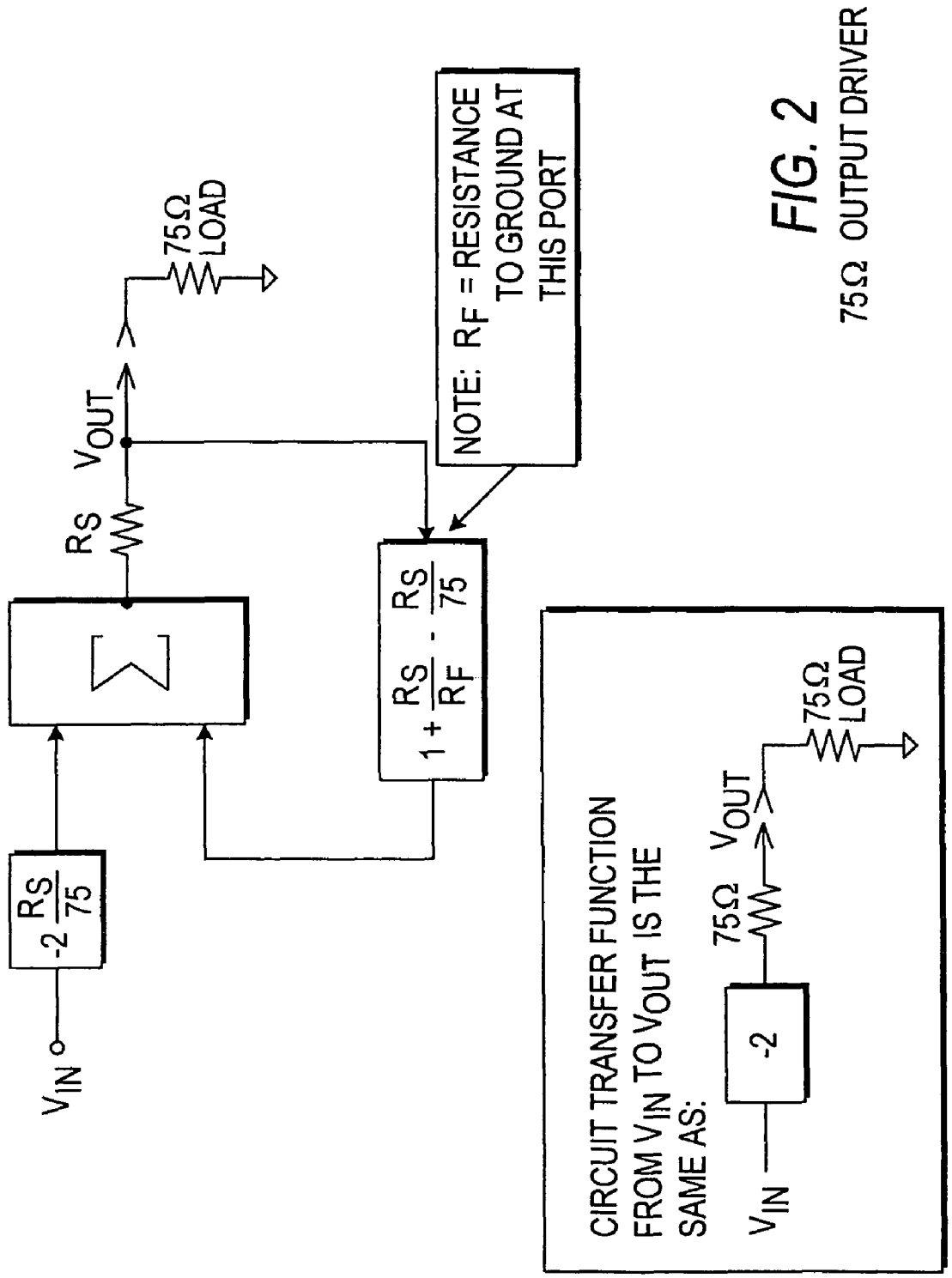
FIG. 2 shows an output driver for output channels of electronic components in the video asset.

Preferred embodiments of the invention will be described with reference to FIGS. 1-15 wherein like reference numerals refer to the same or similar elements.

A. General Arrangement and Common Elements:

The general arrangement of the video asset is shown in FIG. 1 and is designated generally as 10. A VXI Interface 14 is the interface between the video asset 10 and automatic test equipment (ATE) host computer 12. Each of the primary elements, the primary composite video (PCV) 16, secondary video source (SVS) 18, stroke generator (SG) 20 and real time capture (RTC) 22, communicates with the VXI Interface 14 via the Serial Data Interface (SDI) 24. The use of a serial interface reduces printed circuit board complexity and minimizes the possibilities for hostile crosswalk. For the described, preferred embodiment, the SDI 24 is a 6 wire (clock, strobe 4 bi-directional data) high-speed bus. For each data transfer, the SDI 24 utilizes a 48-bit string organized as follows:

4 bit ID code—addresses one of the primary elements 8 bit Header—establishes type of transfer within the addressed primary element; read or write to a register, read or write to a specific asynchronous RAM, read or write to a specific synchronous RAM, or read or write to a specific dynamic RAM.

20 bit Address—points to a specific register, or is physical address for the specified RAM 16 bit Data—read or write data to the above addressed memory element The VXI Interface 14 directly translates between VXI/host communication and the SDI format. The speed of a SDI transfer is such that it completes well within the VXI read/write cycle time. This makes the SDI 24 transparent to the host. Thus, the SDI 24 is transparent to the system and all of the elements appear to be simple base plus offset logical blocks in address space.

As to a distributed time base, clock generation and distribution is the function of DTB 26. Thus, the DTB 26 includes a common high precision crystal oscillator which provides the reference frequency for a series of 4 high-resolution frequency synthesizers individually dedicated to the PCV 16, SVS 18, SG 20 and RTC 22. This allows each primary element to have an independent clock frequency and also permits fully synchronous operation due to the common reference oscillator.

With respect to input/output channels, the video asset 10 has a series of video bandwidth input and output channels. The RTC 22 has three input channels that can handle up to +/−10 volt input. These channels utilize voltage-controlled gain and offset circuits to set the channel's operational parameters. The transfer characteristics of the channels are sensed by means of high-resolution analog to digital converters (ADCs). Precision control digital to analog converters (DACs) provide the necessary control voltages. A software driver resident in the host computer 12 reads the sense ADCs, calculates the necessary control voltages and writes them to the control DACs to achieve the desired characteristics. This arrangement permits the channels to be aligned at the time of use to parameters called for in the test program set (TPS) program. Since the channels are accurately aligned at run time, all long-term drift errors are eliminated. The PCV 16 has three +/−3 volt output channels and two +/−10 volt output channels. The SVS 18 has three +/−3 volt output channels. The SG 20 has three +/−10 volt output channels. (Note: rated voltages are into a 75 Ohm load.) All output channels of similar voltage are identical and feature the same sense and control capability as for the input channels. Additionally, all output channels use a unique output driver stage shown schematically in FIG. 2 in which feedback produces a 75 Ohm output impedance without the expected 2:1 voltage drop into a 75 Ohm load. Lastly, since all the sense ADCs and control DACs have a serial interface, communication with them is achieved via the SDI 24.

In order to achieve the flexibility necessary to support the broadest range of UUT's, the primary elements of the video asset 10 are preferably autonomous or autonomously operational. Other than the VXI Interface 14 and the common reference oscillator, there are no shared assets in the video asset 10. (The DTB 26 and the SDI 24 service multiple elements but they do so without interaction.) This allows each of the primary elements to act as if it is a stand-alone instrument. The only connection between the primary elements is for optional synchronization.

Figure 15:
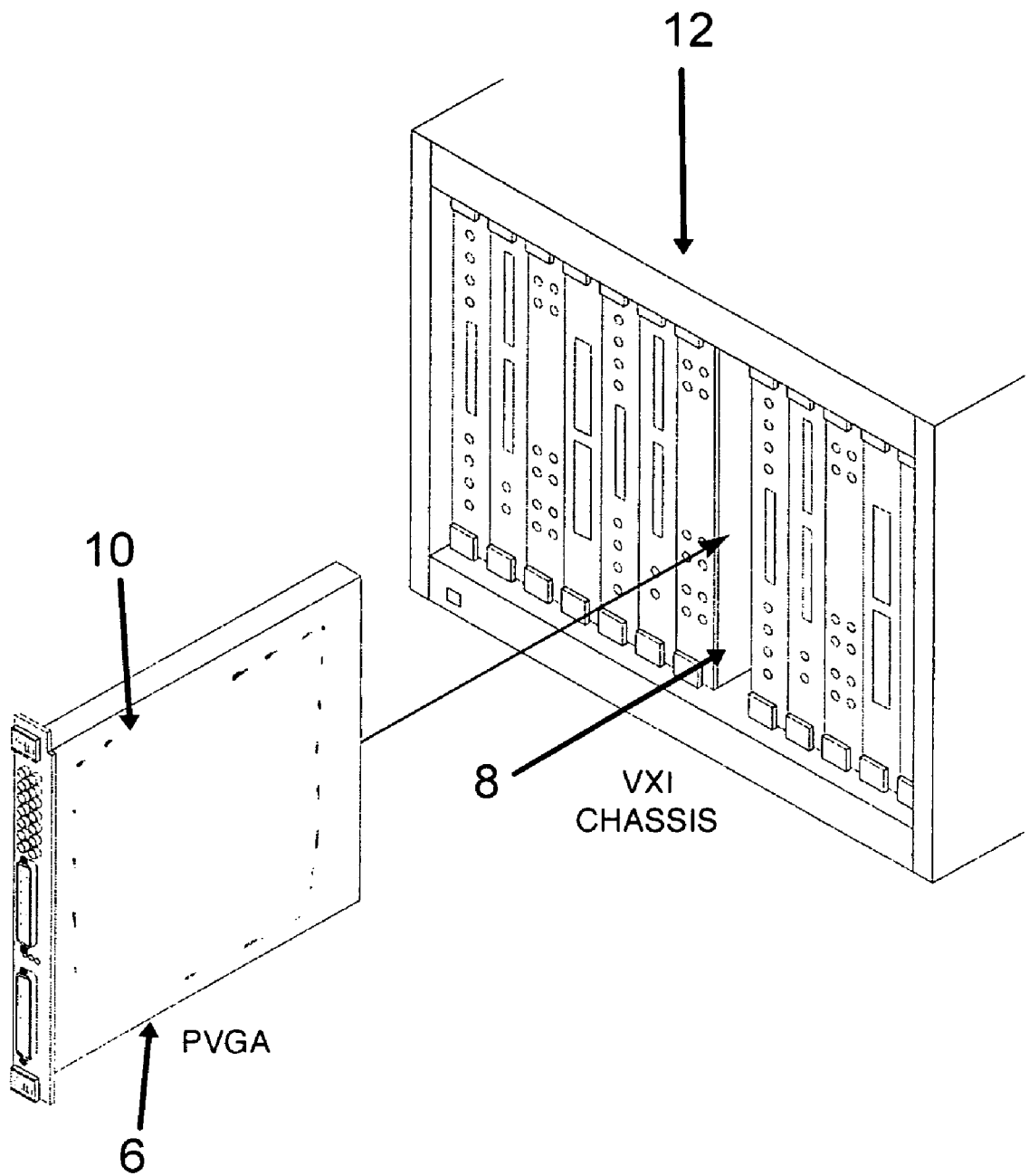
FIG. 15 is a schematic showing the construction of the video asset on a single card adapted for insertion into a slot of a chassis, e.g., a VXI chassis.

Referring now to FIG. 15, as mentioned above, the video asset may be a VXI register based, single "C" size, instrument intended primarily for use in automatic test equipment. As such, the video asset 10 is on or housed in a single card 6 designed for insertion into a single slot 8 of the host computer 12, or more specifically into the chassis of the host computer 12. As known to those skilled in the art, such a card would include the necessary hardware to connect to the chassis. The VXI interface 14 on the card is designed to communicate with the host computer 14.

Each of the primary elements of the video asset 10 is discussed separately below. In the illustrated embodiment, these primary elements are together in the video asset 10, however, different combination of the primary elements can be used in other embodiments. Typically, the video asset would include or communicate with the software calculation and control module SCCM to provide control over the software functions of the other elements, as well as the VXI interface 14. In this regard, if the video asset 10 is communicating with a different system, e.g., a PXI, PCI or LXI system, the interface would be adapted for these systems. Generically then, the VXI interface is a type of external communication bus utilized to program the video asset 10 and also implies the type of bus interface that is designed into the video asset 10.

In addition to an interface and SCCM, a video asset in accordance with the invention would also include two or more of the primary elements from among the Primary Composite Video (PCV) 16, Stroke Generator (SG) 20, Secondary Video Source (SVS) 18 and Real Time Capture (RTC) 22 (those elements in boxes in the video asset shown in FIG. 1). Different combinations of these primary elements include the PCV 16 and the SG 20, alone or in combination with the SVS 18 and/or RTC 22, the PCV 16 and the SVS 18, alone or in combination with the SG 20 and/or the RTC 22, the PCV 16 and the RTC 22, alone or in combination with the SVS 18 and/or SG 20, and the SG 20 and the RTC 22, alone or in combination with the PCV 16 and/or the SVS 18.

The Serial Data Interface (SDI) 24 is important as a means to incorporate a wide data (i.e., communications) bus with just a few signals. Traditional data buses of this size utilize approximately 20+ circuit board traces while the SDI 24 uses 6. This is important because the circuit board is very densely populated and there is not a lot of available space to run extra signals. The reduction in number of digital signals also reduces the overall circuit board 'noise'. However, a video asset 10 can be designed in accordance with the invention without SDI 24.

The Distributed Time Base (DTB) 26 describes the concept of having four high resolution frequency synthesizers (one dedicated to each primary element—the PCV 16, SVS 18, SG 20 and RTC 22) that are independent, yet fully synchronous. Since independent operation is preferred embodiment, a video asset 10 can be designed in accordance with the invention without DTB 26.

B. Primary Composite Video (PCV 16)

Figure 3:
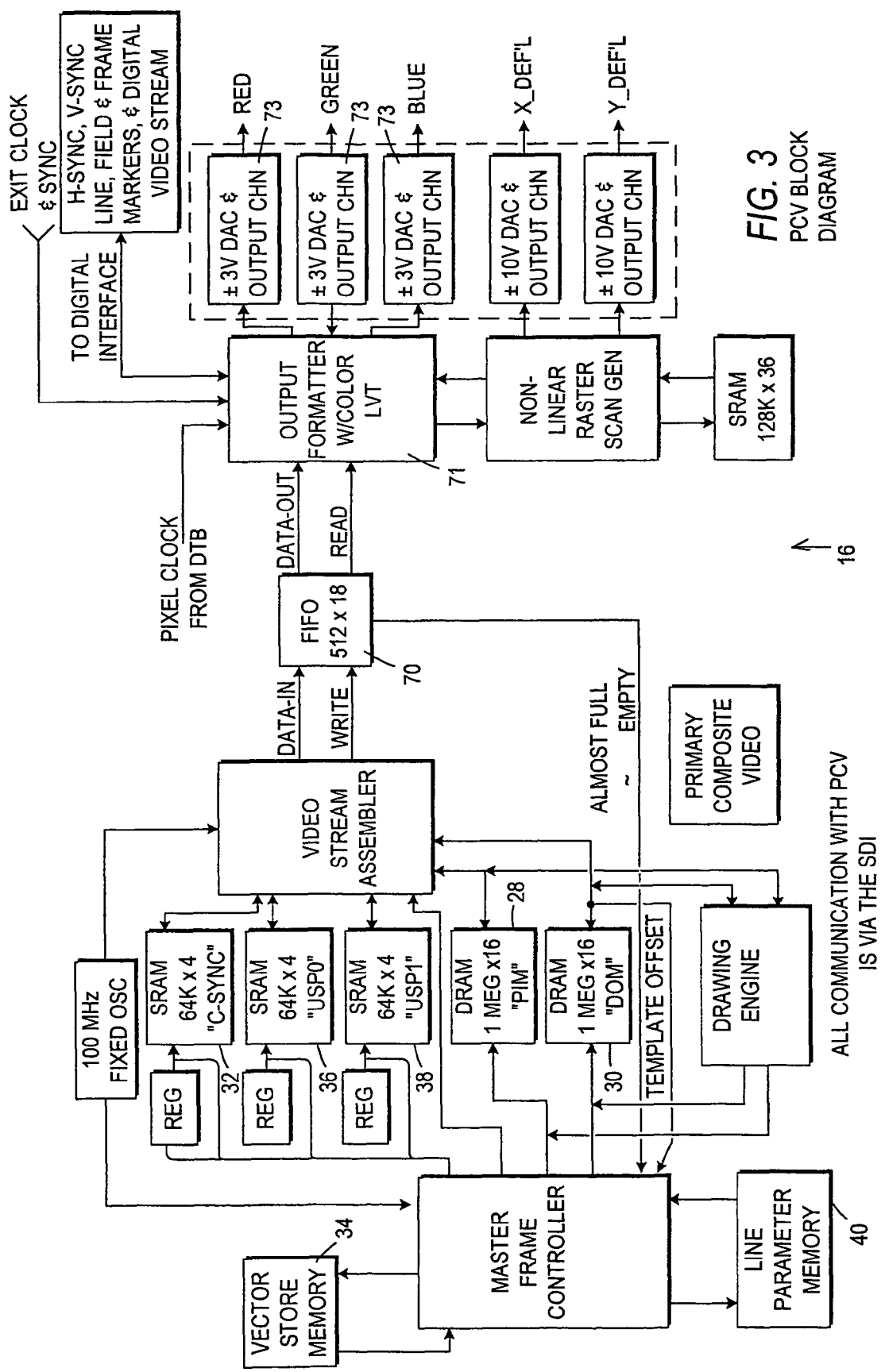
FIG. 3 shows a block diagram of the primary composite video element of the video asset in accordance with the invention.

A block diagram for the PCV 16 is shown in FIG. 3. Its function is to produce video in a wide array of standard and non-standard formats, and capabilities, as follows:

1. Red, Green and Blue (RGB)
   a. Video timing.
      i. pixels per line—up to 2048.
      ii. pixel time—10 nanoseconds or greater.
      iii. lines per frame—up to 2048.
      iv. line duration—5 microseconds to 200 microseconds.
      v. frames per second—determined entirely by line duration and lines per frame.
      vi. sync and blanking, duration—from zero to full line time.
   b. Scan formats.
      i. interlaced.
      ii. non-interlaced.
      iii. all possible patterns—top to bottom, bottom to top, left to right, right to left, reverse, etc.
   c. Sync types
      i. composite with sync on green.
      ii. separate with sync and blanking on individual wires.
      iii. sync and blanking patterns are arbitrary, user specified
   d. Directly driven deflections.
      i. rectilinear.
      ii. polar.
      iii. arbitrary, continuous non-linear.
2. Monochrome—same options as for RGB.
3. Video, sync and blanking levels fully and independently programmable.
4. Image is high-resolution bit mapped with dynamic overlay.
5. Timing markers for line, field and frame are available independent of video format.
6. User programmable timing pulses available to provide any video related special signals.
7. Sync and blanking patterns are specified on a line by line basis for maximum flexibility.
8. Video faults may be simulated on a line by line basis At the core of the PCV 16 is a series of memories—both static and dynamic which hold the various components of the composite video signal and all required ancillary signals. These components include:

Prime Image Memory (PIM) 28—a high density dynamic memory which holds the main bit mapped image. It is organized so that a video line corresponds to a half row in memory. Each entry in the PIM represents four pixels.

Dynamic Overlay Memory (DOM) 30—a high density dynamic memory which holds a series of overlay images and a list of offsets which determine the changing location of the overlay image on a frame by frame basis. The DOM memory space is divided into a series of blocks each of which contains a bit mapped image.

Composite Sync Memory (C-Sync) 32—a medium density static memory which holds the sync and blanking patterns for all of the lines in the video format being generated. The memory is organized as a series of rows each of which holds the sync and blanking for a complete video line in steps of two pixel times.

Vector Store Memory (VSM) 34—a medium density static memory that holds the offsets, overlay pointer and priority for the overlay that is active for the current frame.

User Specified Pulse (USPO and USPI) 36,38—two medium density static memories which hold a series of arbitrary bit line patterns defined in the test program such that all LJUT specific signals which are related to the video signal but not part of it are generated. These memories are both organized as a series of rows each of which holds the arbitrary bit pattern for a complete video line in steps of two pixel times.

Figure 4:
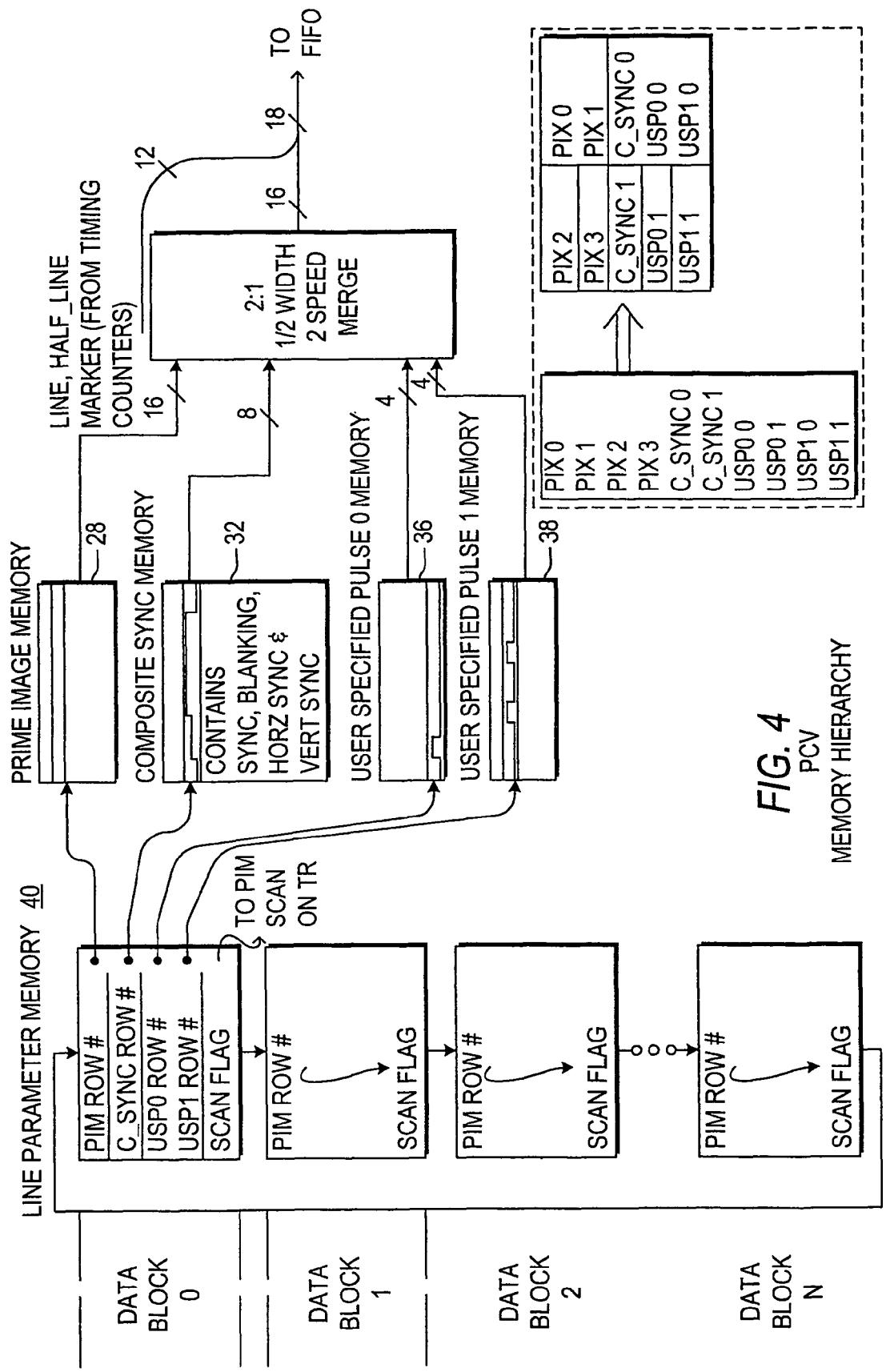
FIG. 4 shows the conceptual control hierarchy of the primary composite video element of the video asset in accordance with the invention.
Figure 5:
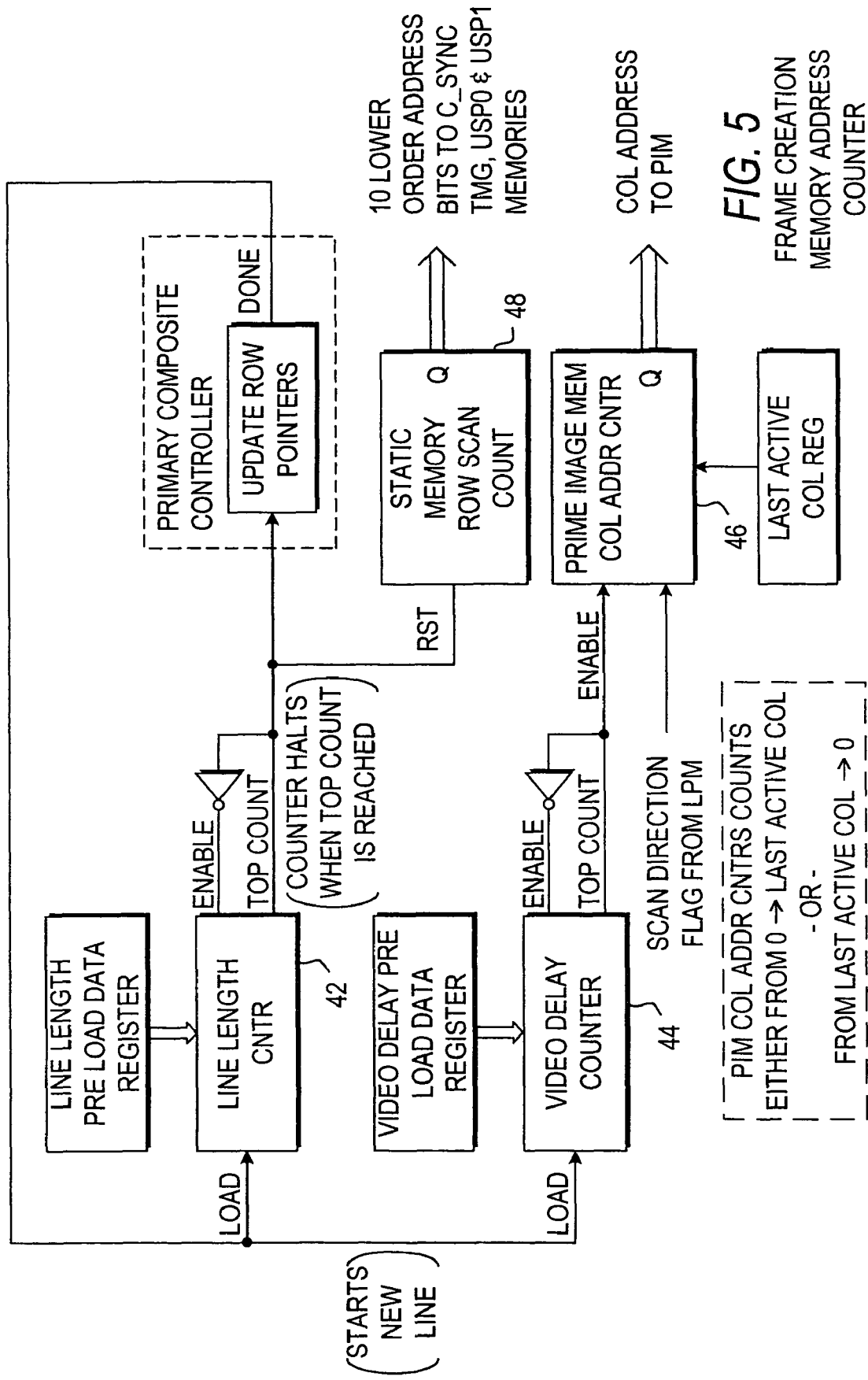
FIG. 5 is a block diagram of the manner in which a new line is created in the primary composite video.

Another static memory, the Line Parameter Memory (LPM) 40 is located one step up in the conceptual control hierarchy as shown in FIG. 4. This memory is organized as a circular queue of data blocks, each of which corresponds to a complete video line. Each block contains pointers to the row entries in the PIM 28, C-Sync 32, USPO 36 and USPI 38 memories discussed above. Also included in the data block is flag for scan direction. This control structure is very flexible in that the components of the video signal are defined line by line.

A frame of video is created line by line. For each line, the PCV 16 reads the LPM 40 and extracts the pointers from the data block for the current line. This takes place during the time after the previous line has finished and before the current line begins (see the discussion on Numeral Time/Real Time below). The pointers determine which row is active in each of the memories. The overall timing of the line is controlled by four counters 42,44,46,48—see FIG. 5 for block diagram. The line length counter 42 determines the total length of the line. The video delay counter 44 determines when the active video begins in a line. Note the video delay counter supports zero delay. The PIM column counter 46 determines which column is to be read from the PIM 28. A static memory row scan counter 48 provides the lower order address for the C-Sync 32, USPO 36 and USPI 38 memories. By convention, a video line begins with the leading edge of the horizontal sync pulse. At the beginning of the line, the line length, video delay and the static memory scan counters 42,44,48 start. When the video delay counter 44 reaches terminal count, the PIM column counter 46 starts. If the scan direction bit is set for left to right, the PIM column counter 46 counts from zero up to maximum value. If the bit is set for right to left, the column counter 46 counts from maximum value down to zero. As the memories are scanned, a 32 bit wide data stream is produced—16 bits from the PIM 28 (4 pixels), 8 bits from the C-Sync 32 (two entries of sync and blanking) and 4 bits each from the two USP's 36,38 (two entries). The data stream is then converted into a 16 bit wide stream at twice the clock rate at which the memories were read. Two additional timing markers for line and half line are concatenated with the 16 bits to produce an 18 bit stream. Each entry in this steam represents two pixels times of data. Lastly, the data is written into the first in first out (FIFO) memory 70 that separates the non-real time portion from the real time portion (FIG. 3). Note that with this control structure scan formats such as. interlaced, non-interlaced, top-to-bottom, bottom-to-top, left-to-right, right-to-left, etc., are established entirely by the order of the PIM row pointers and by the value of the line scan direction flag in the LPM data blocks. Additionally, since a pointer to the C-Sync 32 memory is in each data block, any sync and blanking line pattern can be associated with any line of image. This arrangement supports any arbitrary video format as well as fault simulation. For example, if the UUT is specified to tolerate a certain number of missing horizontal sync pulses, in that number of LPM data blocks set the C-Sync pointer to a row in the C-Sync 32 memory in which the horizontal sync pulse is not present.

Figure 6:
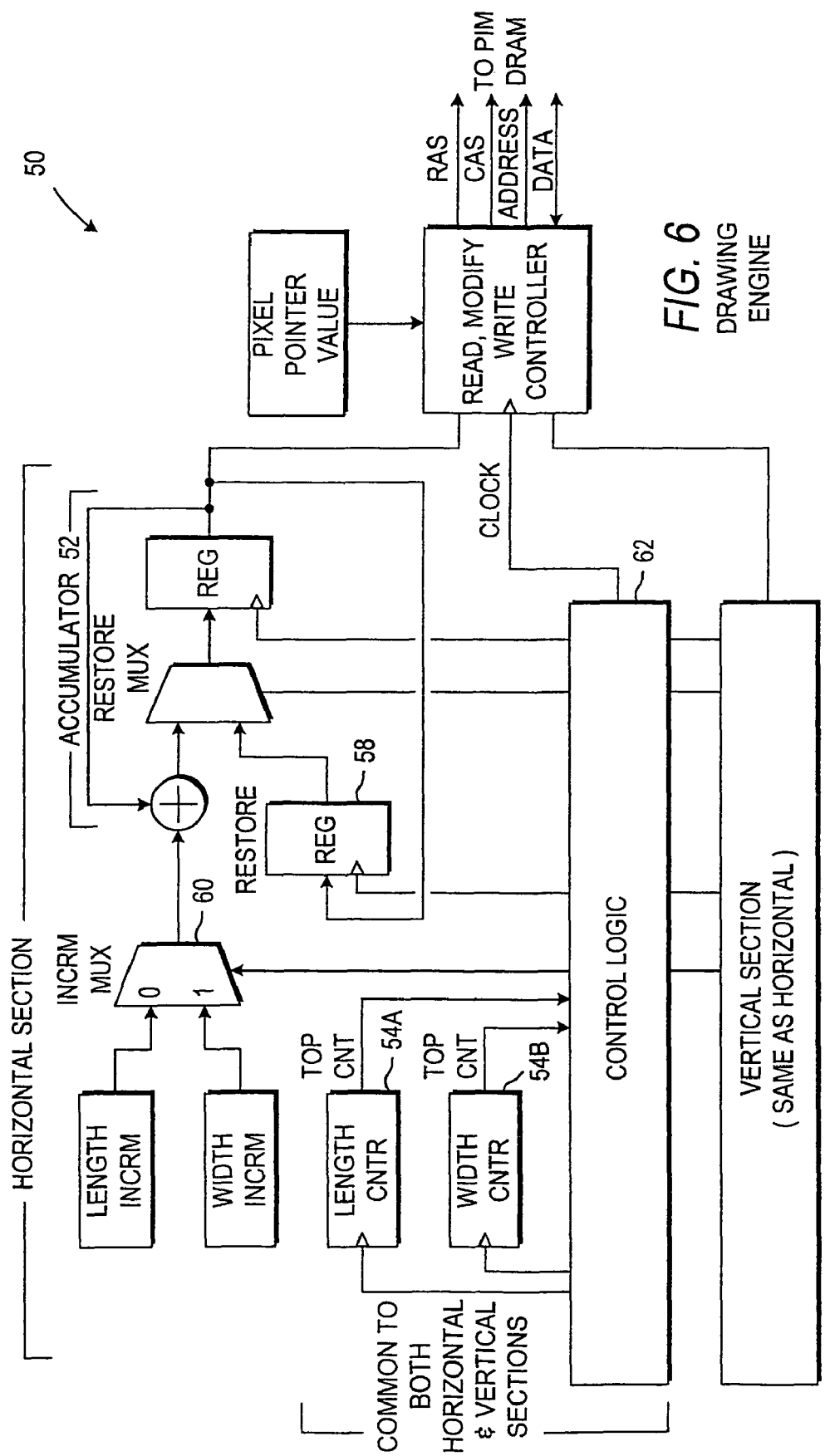
FIG. 6 is a schematic drawing of the drawing engine of the video asset in accordance with the invention.
Figure 7:
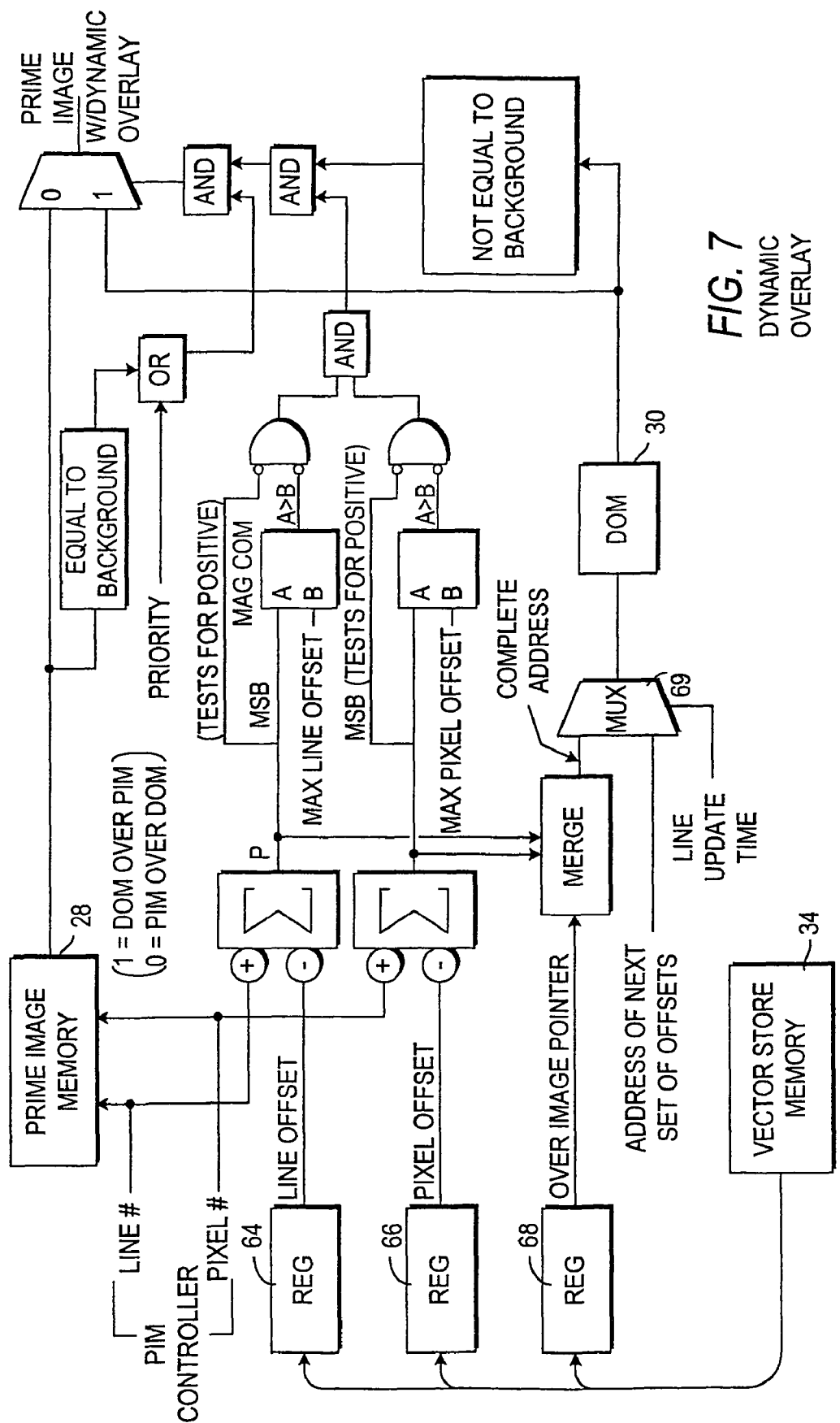
FIG. 7 is a schematic drawing of the dynamic overlay for use with the drawing engine shown in FIG. 6.

To facilitate the efficient loading of the high density PIM 28 and DOM 30 bit mapped memories, a high speed, hardware drawing engine 50 is used (FIG. 6). The drawing engine 50 consists of two high speed accumulators 52—one for the horizontal axis and one for the vertical axis (only the accumulator for the horizontal section is shown). Each accumulator 52 has three associated registers, and, in addition there are two common counters 54 with associated registers as shown in FIG. 6. The host computer 12 calculates eight parameters and passes them over the VXI bus 14 to the drawing engine 50. The nine parameters are:

1,2. Start pixel—horizontal and vertical (2 parameters).
  3,4. Length increment—horizontal and vertical (2 parameters).
  5,6. Width increment—horizontal and vertical (2 parameters).
  7. Length iterations—common.
  8. Width iterations—common.
  9. Pixel pointer value.

The function of the drawing engine 50 is to write into the image memory a line of arbitrary position. orientation, length and width based on the received parameters. The parameters are loaded into the registers 58, counters 54*a,* 54*b* and accumulator 52 as shown in FIG. 6. With the start pixel values loaded into the horizontal and vertical accumulators 52, the drawing engine 50 is pointing to the first pixel to be written.

The drawing engine 50 writes the received pixel pointer value into the image memory. The accumulators 52 are clocked causing them to advance in the horizontal and vertical direction by the received horizontal and vertical length increments. Another pixel is written into the image memory at the new address and the process repeats. In so doing, a single pixel wide line is drawn in the image memory. For each clocking of the accumulator 52, the length iteration counter 54*a* is also advanced. When the length iteration counter 54*a* reaches top count, the pixel writing halts. The accumulators 52 are then directly loaded with start values from the restore register 58, the increment mux 60 selects width increment and the accumulators 52 are clocked once. This moves the drawing engine 50 one pixel step along the Width axis of the line being drawn. The new state of the accumulators 52 is loaded into the restore registers 58 and the width iteration counter 54*b* is advanced. Next, the increment mux 60 is set back to length increment and pixel writing as before resumes. This draws another single pixel wide line contiguous to the line drawn in the previous pass along the length axis. When this new line is complete the cycle repeats until the width counter 54*b* reaches top count. In this manner, a line of arbitrary width and length is drawn into the image memory at maximum speed supported by the memory. Note that the ratio of the horizontal and vertical length increments determines the orientation of the line being drawn. The size of the accumulator 52 and registers 58 is large enough for the increment parameters to be specified with sufficient precision to ensure that for even the longest and widest line that can be written, the cumulative errors will always be small compared to the least significant bit of the horizontal and vertical address. Also of note, in this preferred embodiment of the video asset 10, the physical memory space for the primary image is 2048 pixels by 2048 lines. However, the drawing engine 50 operates as if the available memory space is 8192 by 8192 with the physical memory space centrally located. This allows images to drawn partially outside of the physical memory space without the image wrapping around to the other side of the physical memory space.

The video asset 10 has the capability to superimpose a dynamic image over the primary, static image. The dynamic overlay images and their associated list of offsets are stored in the DOM 30. For each overlay image in the DOM 30, a memory space, or template, is allocated. The template size is specified as 'V' lines by 'H' pixels. The overlay image is written into its template by the drawing engine 50 as previously described. Activation and merging of the overlay image is accomplished by the DOM controller portion 62 of the PCV 16—see FIG. 7. During the line update interval, the DOM controller 62 reads the next offset entry from the Vector Store Memory (VSM) 34. Each entry in the VSM 34 holds four data items; line offset loaded into register 64, pixel offset loaded into register 66, overlay image pointer loaded into register 68, and priority. The controller 62 compares the overlay line offset to the pending line of the primary image. If the pending primary image line falls between the line offset and the line offset plus the template line size, i.e., overlay line offset <=pending primary line <=overlay line offset +'V', then the overlay image will be active during the pending line. If not, no further activity takes place until the next primary line update. If the overlay is to be active during pending primary line, the overlay image line to be accessed is the primary pending line minus the overlay line offset. During the actual scan of the primary image line, the pixel address is continuously compared with the overlay pixel offset. When the primary pixel address falls on or between the overlay pixel offset and the overlay pixel offset plus 'H', then scan shifts from the primary image to dynamic overlay image. However, if the current overlay image pixel value is the background value and the priority bit is set to DOM over PIM, a hardware mux 69 selects the primary pixel instead of the overlay pixel. This makes the background 'color' of the overlay image transparent so that overlay image can be seen over the primary image, but not shape of overlay template. If the priority bit is set to PIM over DOM, the active pixels of the overlay are selected only during the primary image background color. This puts the overlay image underneath the primary. When scanning the dynamic overlay image line, the overlay pixel address is equal to the primary pixel address minus the overlay pixel offset. This method of the transferring scan from the primary to the overlay memory is independent of the scan direction either vertically or horizontally. To complete the DOM address field when accessing the template stored image, the overlay image pointer 68 points to a pair of registers in the controller 62 which contain the template horizontal and vertical offsets within the DOM 30. These offsets are hardware added to the template line and pixel address to form the complete DOM address. This is also how individual templates are selected.

The DOM controller 62 preferably uses the same addressing model as the drawing engine 50, i.e., a 2048 by 2048 physical memory located within a 8192 by 8192 virtual space. This allows overlay images to move into or out of the actual primary image space without wrap around or other complications. Since both position and template can be selected on a frame by frame basis the motion and image content are arbitrarily flexible in real time.

With respect to Non-Real Time/Real Time Division, control of the PCV 16 requires a number of overhead operations. They are as follows:

1. Line update—before the beginning of a new line, the PCV controller 62 transfers row pointers from the LPM 40 to their associated registers, strobes the row address into the dynamic memory and reinitializes all counters.

2. Dynamic memory refresh—to maintain valid data in the dynamic memories, they must be periodically refreshed. A refresh controller with an integral timer takes control of the dynamic memories, performs a partial refresh operation and then returns control to the PCV controller 62. The refresh operation is repeated often enough to ensure valid data.

3. DOM initialization—when the image scan transfers from the PIM 28 to the DOM 30, it is necessary to halt all memory reads, strobe appropriate row address into the DOM, 30 load the DOM column counter with the calculated value and then synchronously restart the PCV 16 and the DOM 30.

At the same time as these operations are being performed, the video output should not be interrupted. To achieve this, the PCV 16 is divided into two parts; the non-real time and real time. The two parts are connected only by a 512 word deep, 18 bit wide first-in-first-out (FIFO) memory 70. Referring back to FIG. 3, everything on the input (write) side of the FIFO memory 70 is the non-real time portion and everything on the output (read) side of the FIFO memory 70 is the real time portion. Most of the PCV 16 is in the non-real time portion where all of the components of the video and ancillary signals are merged. The non-real time portion writes into the FIFO memory 70 at a fixed rate which is the maximum rate supported by the hardware. The FIFO memory 70 has programmable flags for almost fall and almost empty. Video data is written into the FIFO memory 70 until the almost full flag is asserted. At that time, the whole non-real time portion halts. When the almost empty flag is asserted—programmed to happen when the FIFO memory 70 is half full—the non-real portion restarts and resumes writing data into the FIFO memory 70. On the output side of the FIFO memory 70, data is read out to an output formatter 71 (discussed below) at the rate of one half the actual pixel clock since each word written into the FIFO memory 70 contains two pixels. With the FIFO memory 70 never less than half full, even at the fastest supported pixel clock in this embodiment, there is always at least 12 microseconds of video data stored in the FIFO memory 70. These 12 microseconds are more than enough to cover the worst case combination of interrupts to non-real time portion of the PCV 16. Thus, as seen from the real time portion of the PCV 16, the above listed overhead activities are completed in zero time.

Figure 8:
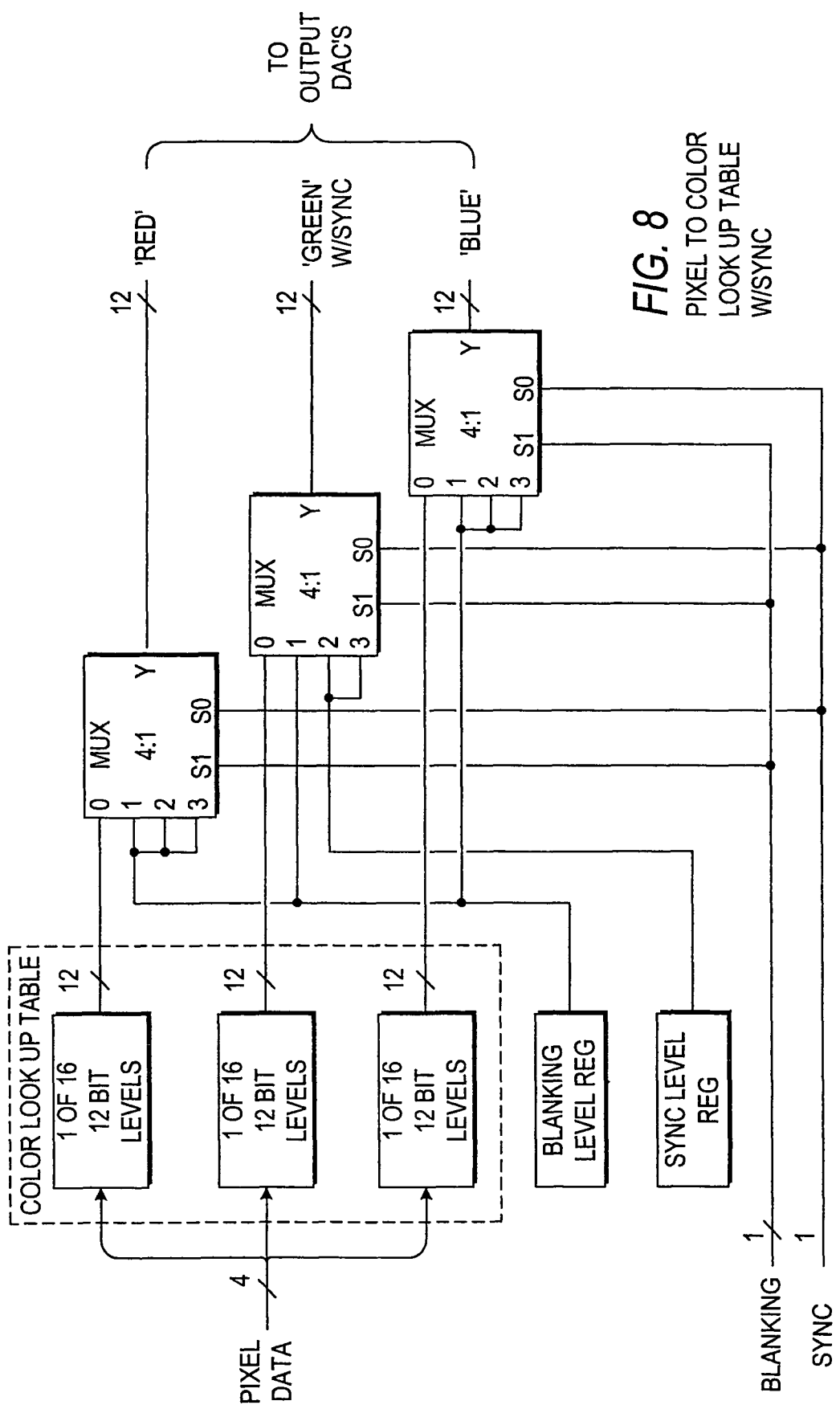
FIG. 8 is a schematic diagram of a pixel-to-color look-up table with sync for use in the video asset in accordance with the invention.

A Pixel Look Up Table/Output Formatter 71 reads data out of the FIFO memory 70 discussed above. The received data is divided into two parts—video and ancillary. The video portion consists of the 8 bits (two Pixels) of image and I bit sync and 1 bit blanking. The two pixels of image are converted to a one pixel wide steam running at the full speed pixel clock. The four bits per pixel act as a pointer into a color look up table. In each of the 16 locations in the table are stored 12 bits each for red, green and blue. Thus, in the preferred embodiment, the color option of 16 shades from a palette of about 68.7 billion. If the accompanying blanking bit is asserted, the user specified value for blanking is substituted for the red, green and blue color look up table values. If the sync bit is asserted, the red and blue color look up table outputs are forced to the blanking value and the green output is forced to the user specified sync level. By convention, sync pulses appear only on the green output. Blanking overrides pixel data, and sync overrides both blanking and pixel data. FIG. 8 shows a block diagram for the pixel-to-color look-up table with sync. The 12 bits of red, green and blue are applied to three video speed digital to analog converters (DAC's) 73. The output of each of these converters 73 is directed to a +/−3 volt output channel where it is modified to meet the user's output level specifications. The remainder of the data from the FIFO memory 70 is the ancillary timing markers for line, field and frame, and the arbitrary bit patterns from the two USP memories 36, 38. These are maintained in digital form, buffered and sent to the user interface.

The USP memories 36, 38 provide the video asset 10 with a built-in ancillary user-programmable signal generators synchronized to the primary video outputs. The programmable signal generating function of the USP memories enables the creation of pulses on a line-by-line basis with variable timing and duration.

Figure 9:
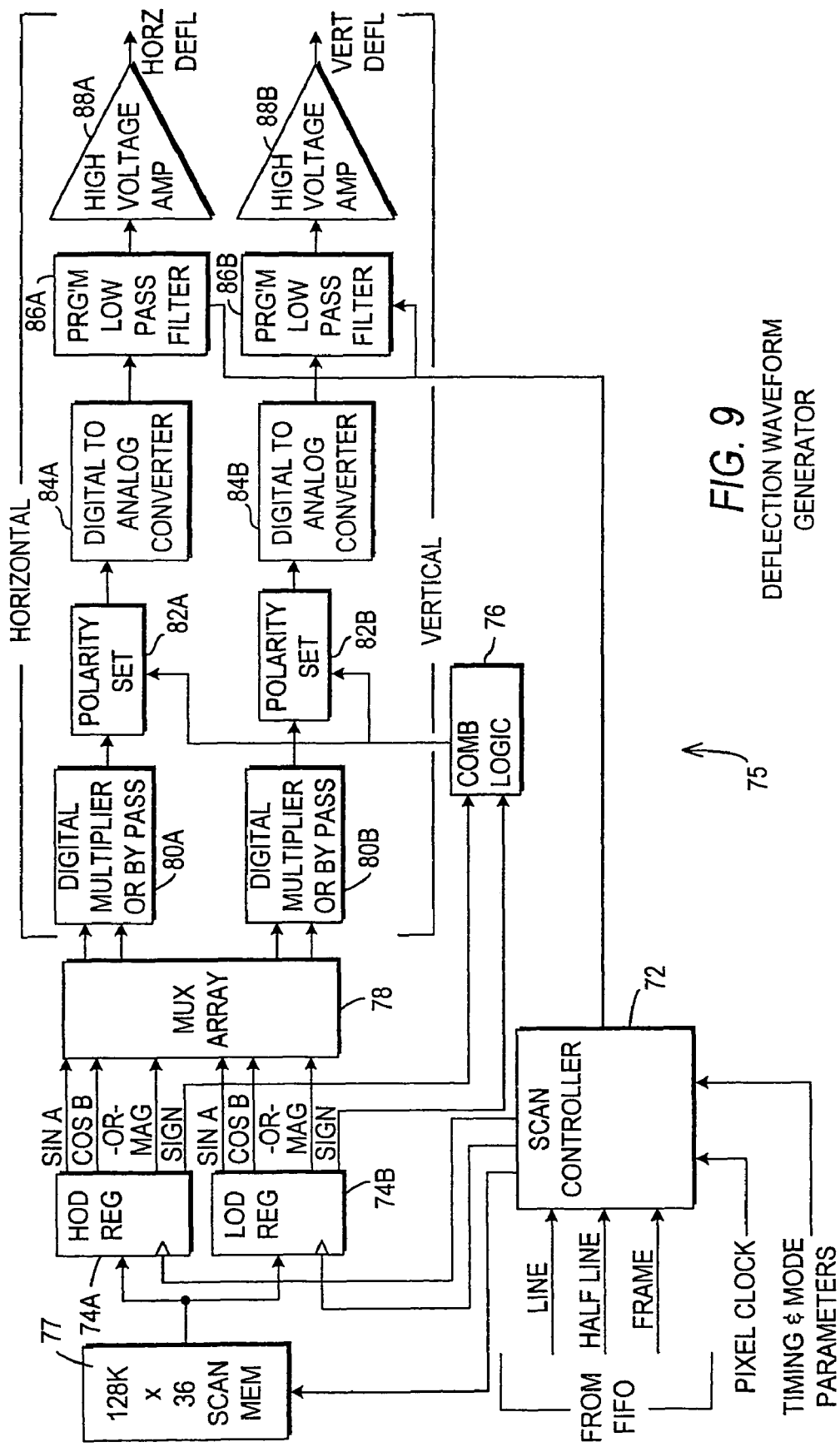
FIG. 9 is a schematic diagram of a deflection waveform generator for use in the video asset in accordance with the invention.

With respect to linear/non-linear deflection, to support UUT's that require externally provided deflection waveforms (for testing with both modulated and non-modulated raster video signals), a multi-format deflection waveform generator 75 is included in the PCV element 16. FIG. 9 shows a block diagram for a deflection waveform generator 75 for use in the video asset 10. The high density Scan Memory 77 holds a series of data blocks for both the faster deflection (HOD) waveform and the slower deflection (LOD) waveform. The contents of each data block are a function of the programmed mode. For example, if a modulated raster video signals such as a polar scan is required, one set, HOD or LOD, will contain the sine and cosine of angle and the other set will contain magnitude data. If a non-modulated raster video signal such as a rectilinear scan is required, then both sets contain magnitude data only. The Scan Controller 72 controls the transfer of these blocks from the Scan Memory 77 to the HOD register 74A and the LOD register 74B. The transfer timing is based on programmed timing and mode parameters and the line, half-line and frame timing pulses. The Mux Array 78, also under control of the Scan Controller 72 routes the HOD register 74A and LOD register 74B data to achieve either fast angle/slow magnitude (spiral scan—e.g., sonar displays), or fast magnitude/slow angle (sector scan—e.g., radar displays) as required. Two digital multipliers 80A and 80B are coupled to the Mux array 78 and convert the register data into modulated scan waveforms. Each of the multipliers 80A and 80B has a bypass mode that is activated for simple rectilinear scan. Since the multipliers 80A and 80B operate on unsigned integers only, the resultant polarity is set after multiplication. The two polarity set modules 82A and 82B, coupled to the multipliers 80A and 80B, respectively, convert the multiplier outputs to the correct polarity as a combinational function of two sign bits—one from the HOD register 74A and one from the LOD register 74B obtained through combination logic component 76. Then the two resultant data streams are then converted to analog signals by Digital to Analog Converters 84A and 84B. Two programmable low pass filters 86A and 86B are coupled to the DAC's 84A and 84B, respectively and are used to band-limit the deflection waveforms to remove the sampling noise and produce smooth shapes. The outputs of these low pass filters 86A, 86B are sent though +/−10 volt output channels 88A and 88B, respectively, where they are modified to meet the user specification for deflection levels.

C. Stroke Generator (SG 20)

Figure 10:
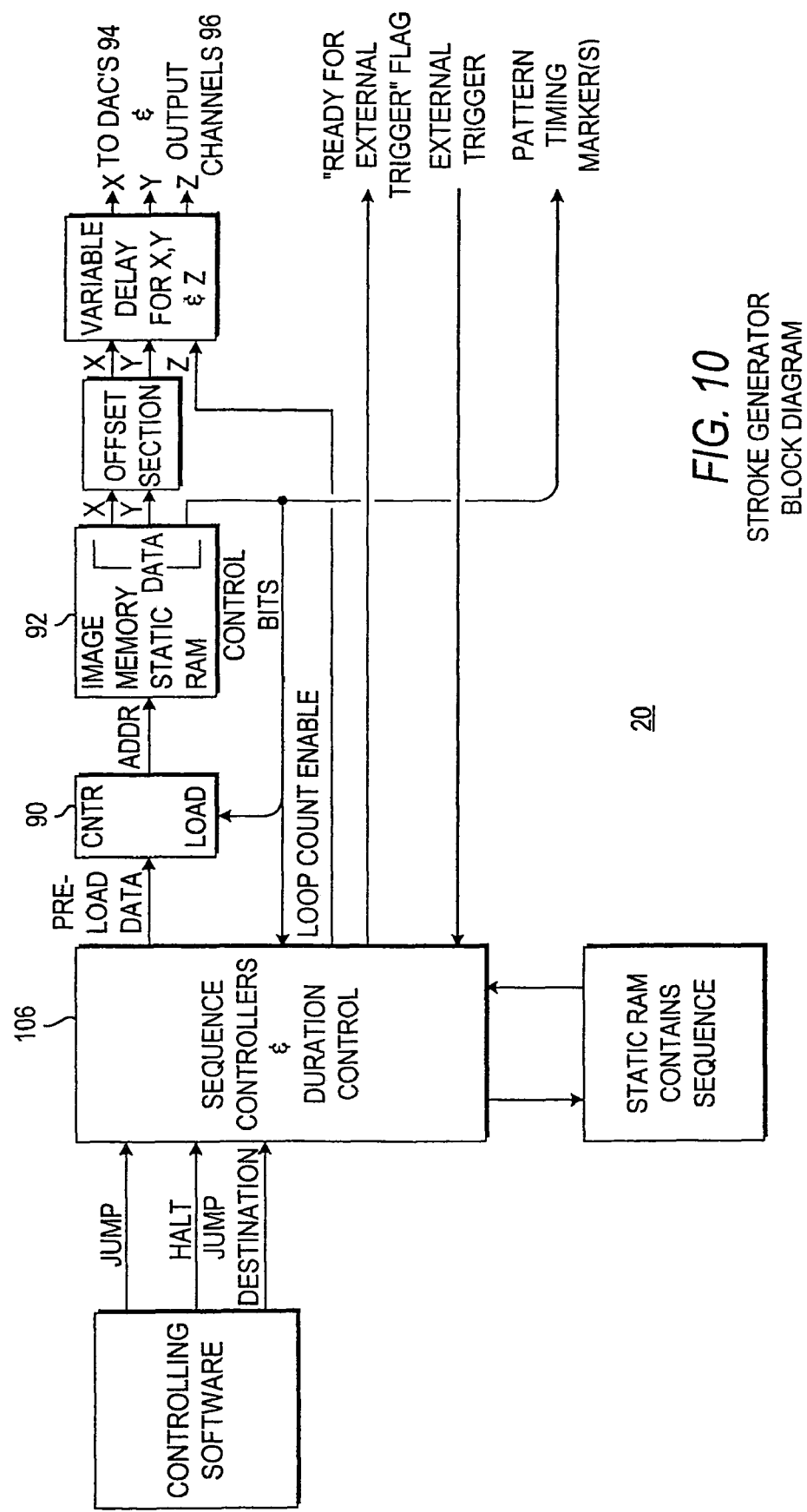
FIG. 10 is a schematic diagram of a stroke generator for use in the video asset in accordance with the invention.

The function of the stroke generator 20 (also referred to as a stroke video generator) is to generate stroke, or X-Y-Z, video in which the image is drawn on the screen by directly moving the beam along the lines of the image being drawn. A block diagram for the stroke generator is shown in FIG. 10.

In the invention, high level software constructs are applied in a novel manner to control the sequential display and operation of the stroke video generator 20. While these high level software constructs are known and in common use (such as in the 'C' programming language), the application of these constructs to the control and sequencing of stroke video test generation is not believed to be known in the prior art, nor it is believed that such would be obvious to one skilled in the relevant art. Previously, the creation of sophisticated stroke video test displays (such as those requiring pattern motion) required very tedious and lengthy programming efforts by the operator. Programming was produced by linear statements (one after the next) with no provisional for conditional branching or looping. By applying high level software constructs to this task, the following efficiencies and advantages are realized:

1) The operator's programming task (effort and time) is significantly reduced by the elimination of all repetitive commands. Far less time is spent creating a test display.
2) Completed operator software routines are compact and modular, permitting reusability.
3) The quantity of physical memory required within the stroke video generator 20 is highly reduced.
4) The software interface to the operator is highly simplified since the hardware operates directly on the programmed constructs via an integrated state machine. The software interface is no longer responsible for establishing a lengthy display sequence. It is only responsible for passing the high level constructs to the hardware state machine. See FIG. 11 (Stroke Generator Control Structure).

Exemplifying high level software constructs that can be utilized in preferred embodiments of a stroke video generator 20 in accordance with the invention include:

1) GOTO. This construct allows a direct jump to a different segment of code, usually as a target of a conditional test or to implement an infinite loop. In application to stroke video generation, a display sequence could be repeated infinitely by placing a GOTO at the end of the sequence which points to the beginning of the sequence.
2) GOSUB. This construct allows a direct jump to an independent segment of code and subsequent return to the original location. This allows redundant code to be isolated to a single occurrence and utilized repetitively. In the application of stroke video generation, if a grid (consisting of several distinct lines) should be drawn in multiple locations on the display, one subroutine could be defined which contains the line drawing sequence for the construction of that grid. The call to that subroutine (GOSUB) would replace every previous occurrence of that line drawing sequence resulting in substantial efficiency. Without this construct, the programmed sequence would be significantly longer and might not even be possible.
3) RETURN. This construct signals the end of a subroutine and a jump back to the calling location.
4) IF-THEN-ELSE. This construct specifies a branch choosing between two paths of executable sequence code controlled by a conditional test. The tested condition is an asynchronous external event (an operator function call to the software driver). In the application of stroke video generation, a test pattern could be continuously generated on a display until the operator chooses to illuminate the next programmed test pattern. Without this construct, all video generation would have to be created one pattern at a time, terminated and then reprogrammed.
5) DO-WHILE loop. This construct specifies a repetitive loop of executable code from which the exit is controlled by a conditional test. The test is a specified loop count which is usually defined to create a calculated time duration. Without this construct, it would be extremely difficult to display objects for specific time intervals.
6) Nesting—The ability to nest the previous constructs (i.e. embed; loop within a loop) to gain added flexibility and efficiency.

These constructs are integrated with the instrument specific commands which control pattern display intensities and incremental pattern offset.

The high level software constructs mentioned above are non-limiting and other software Is constructs can be used in embodiments of the invention.

Set forth below is a sample "C" language program to create stroke video utilizing the AVA video asset 10. In this example, a single character will be drawn at three zoom sizes simultaneously while being moved across the stroke video display. Without high level constructs, this process would involve manually placing the characters at each position on the display and calculating the points on each vector used in the drawing. In essence, the characters would be recalculated thousands of times and require a vast amount of memory to store each vector point.

As is evident in this example, the characters require minimal memory since they are defined only once and moved dynamically (within the AVA stroke video generator 20) as defined with the high level constructs. The whole process is reduced from thousands of function calls to only 12 with the AVA software library.

```
/************************************************************/
First, define the unique objects to be drawn on the display. Here, we will
define a simple "X" shape.
X0[0] = 0; Y0[0] = 0; X1[0] = 100; Y1[0] = 100;
X0[1] = 100; Y0[1] = 0; X1[1] = 0; Y1[1] = 100;
/************************************************************/
```

Calculate and store 3 sizes (x1, x2, x3) of the "X" character. Pointers to each "X" are returned in the CrossPointer array.

```
/************************************************************/
for(i = 1; i <= 3; i++)
    stat = VGen__StrokeTemplateDraw(1, 2, X0, Y0, X1, Y1,
        &(CrossPointer[i]));
/************************************************************/
```

Define a subroutine which will draw all three X's. A pointer to the entry position of this subroutine will be saved in the variable 'sequence1'.

```
/************************************************************/
    stat = VGen__StrokeDisplay(CrossPointer[1],
        LOOP_FOR_COUNT, 1.0, &sequence1);
    stat = VGen__StrokeDisplay(CrossPointer[2],
        LOOP_FOR_COUNT, 1.0, &i1);
    stat = VGen__StrokeDisplay(CrossPointer[3],
        LOOP_FOR_COUNT, 1.0, &i1);
    stat = VGen__StrokeReturn(&i1;);
/************************************************************/
```

Define the main sequence. Move the character group across the X axis by increments of one.

```
/************************************************************/
    stat = VGen__StrokeSelectOffset(1, &i1);
        /* Select an offset register to use (#1). */
    stat = VGen__StrokeProgMarker(SEQ_START, &i1);
        /* Denote the start of the sequence */
    stat = VGen__StrokeProgJump(GOSUB, sequence1, &2);
        /* Call our "X" display subroutine. */
    stat = VGen__StrokePattOffset(SET_INCREMENT, 1.0, 0.0, &i3);
        /* Incr the display position */
    stat= VGen__StrokeLoopBack(i2, 1000, &i4);
        /* Loop back and repeat 1000 times */
/************************************************************/
```

At the core of the stroke generator 20 is a register providing preload data to a counter 90, the counter 90 providing addresses to an image memory (static RAM) 92, and the memory 92 providing data to a trio of digital to analog converters 94. The output of each of these converters 94 is directed to a respective +/−10 volt output channel 96 where it is modified to meet the user's output level specifications. The data stored in the memory 92 is comprised of four parts:
 a) X deflection data.
 b) Y deflection data.
 c) Z modulation (on/off) data.
 d) Control bits
    i. counter load bit
    ii. loop count enable bit
    iii. pattern timing marker(s)—user specified.

The counter 90 starts at the preload value from a register and increments with the applied clock. As its address increments, the memory 92 outputs a stream of data which is then converted to analog by converters 94 producing the programmed deflections and intensity. One of the control bits in the memory data is connected to the load control port of the counter. At the last data word in the pattern being produced, this bit is asserted. On the next applied clock, the counter 90 is loaded to its preload value and pattern repeats. In essence, this core is a three channel arbitrary function generator. Unlike an arbitrary function generator, the stroke generator 20 of the video asset 10 has an unique, three level, hierarchical control structure shown in FIG. 11. At the lowest level is the simple looping mechanism described above. Here the pattern being generated is the determined by the value stored in the preload register. That value is always the starting address of the pattern to be generated. To change from one pattern to another, is necessary only to change the preload value to the starting address of the next pattern to be generated. A pattern starting address of 0 is arbitrarily designated as the halt state for the core looping mechanism. In the memory at address 0 are the quiescent values for X, Y, and Z, as defined in the test program. Also, at address 0, the counter load bit is asserted, so that once the counter 90 is loaded with 0 it remains at 0 until the preload value is changed to a different pattern starting address.

The image memory 92 functions in part as user-programmable signal generators which generate signals synchronized to the stroke video signal output of the stroke generator, i.e., the output of the pattern timing markers (see FIG. 10). The pattern timing markers are four digital signals which are user-defined for each stroke video image for the purpose of providing timing markers or digital handshaking signals. The video asset 10 thus has a unique built-in capability of providing synchronized handshaking signals and does not require external control equipment to generate such handshaking signals.

The middle level of the hierarchy 98 controls the duration for which each pattern starting address is presented to the core looping mechanism 100. There are four modes, with corresponding hardware modules, available at this duration control level:

1. Loop for programmed number of iterations (loop counter).
2. Loop until external trigger is received and then jump immediately (short external jump).
3. Loop until external trigger is received and then jump at end of current loop (long external jump.)
4. Loop until software trigger is received and then jump at end of current loop.

In mode 1, the pattern repeats for a fixed duration. The software driver for the video asset will convert the user specified length of time into the equivalent number of pattern loops. A hardware counter will be loaded with that number. One of the control bits from the memory data word is used to enable the loop counter once per loop. When the counter reaches top count, the next pattern starting address is applied to the core looping mechanism 100. In modes 2 and 3, the core loops until an external trigger is received at which time the starting address for the next pattern is applied to the core. In the short external mode (#2), the jump is executed immediately, while in mode #3, the jump is delayed until the loop count enable bit is asserted. This mode is particularly useful for simulating transfer of control between the UUT and the automatic test equipment. Mode 4 is the simplest; the current pattern runs continuously until the test program supplies sets a register bit which is converted into a synchronous pulse that triggers a jump.

At the top of the control hierarchy is the sequence controller 106 wherein at least nine possible data block types are used to create pattern sequences from the simplest image to very complex interactive displays. The data types can be used in any order, all in the same sequence program, exclusively in a sequence program, and/or with other possible data types, etc. The nine data types, or software constructs, are used to create a sequence program that is executed by the sequence controller 106 in order to provide the pre-load data to the counter 90 necessary to create the desired stroke video signals. The data types in the list include:

1. Display.
2. Goto.
3. Gosub.
4. Return
5. Loop Back For
6. Real Time Branch
7. Select Offset
8. Direct Offset
9. Incremental Offset
10. Program Stop.

The first type, Display, holds all the data necessary to initiate and control a pattern:

1. Pattern Starting Address.
2. Loop Count.
3. Z intensity.
4. Duration Mode.

When the current pattern terminates as determined by the duration control section, the four data fields are loaded into their respective registers in the duration control 98 and core looping mechanism 100 sections. The sequence list controller then executes the sequence program until the next display block is encountered. The controller then halts and waits for the "done" pulse from the duration control section 98. The non-display types (2 through 9) control the flow of the sequence program and thus of the overall display being generated Type 2, Goto, is a simple unconditional jump to a specified block on the sequence list. This would be primarily used to cause the sequence program to loop continuously. Type 3, Gosub, causes the sequence program to jump to a specified location and execute until a Return is encountered. The Return, type 4 causes the program to jump back to the program step just after the Gosub location. Type 5, Loop Back For, defines a local loop of program steps that are executed for a programmed number of iterations. Type 6, Real Time Branch, causes the program to jump back to a specified location on the sequence program and loop forward until the software program writes to a specific register. When the register has to written to, the program jumps to location specified in that register. Type 7, Select Offset, contains a pointer to one pair of a set of offset registers pairs. Once an offset register pair has been selected it is used for all offset operations (Types 8 and 9) until another register pair is selected. The contents of all register pairs are retained, i.e., an offset register pair, when selected, will contain the last offset parameters written to it. Type 8, Direct Offset, contains two data fields—X-offset and Y-offset—which are transferred to the selected register pairs shown as 170,172 (see FIG. 10A) that are added to the X and Y deflection data from the core looping mechanism 100 in adders 174,176, respectively. This has the effect of relocating a display. Type 9, Incremental Offset, has two data fields—X-increment and Y-increment—which are added to contents of the selected X-offset and Y-offset register pair (at adders 178,180, respectively, see FIG. 10A). When this type is used within a loop, it has the effect of creating continuous motion of the display. The last Type 10, Program Stop, simply causes the core looping mechanism 100 to jump to the halt state.

Figure 10B:
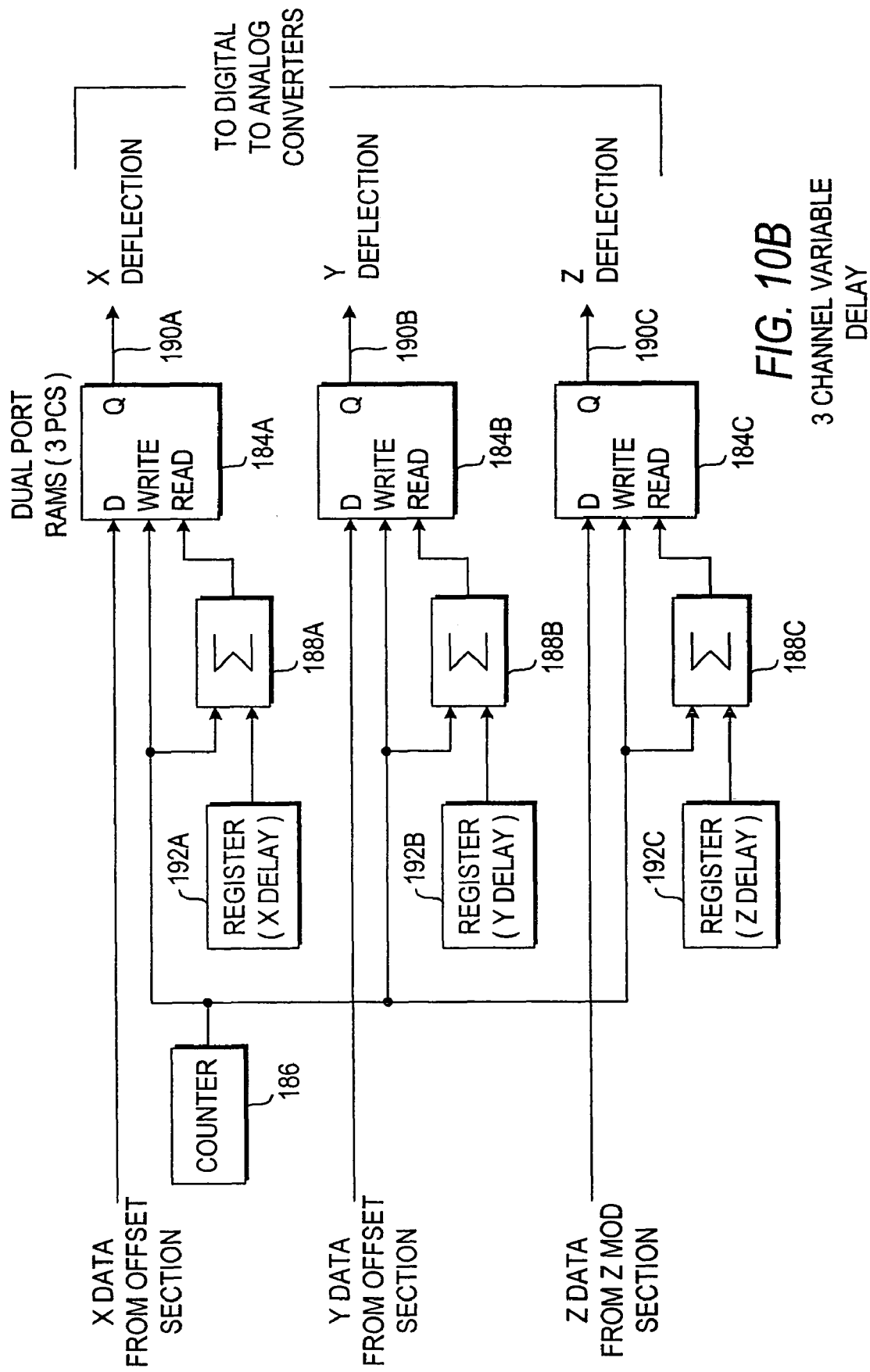
FIG. 10B is a schematic diagram of a three channel variable delay section of the stroke generator.
Figure 11:
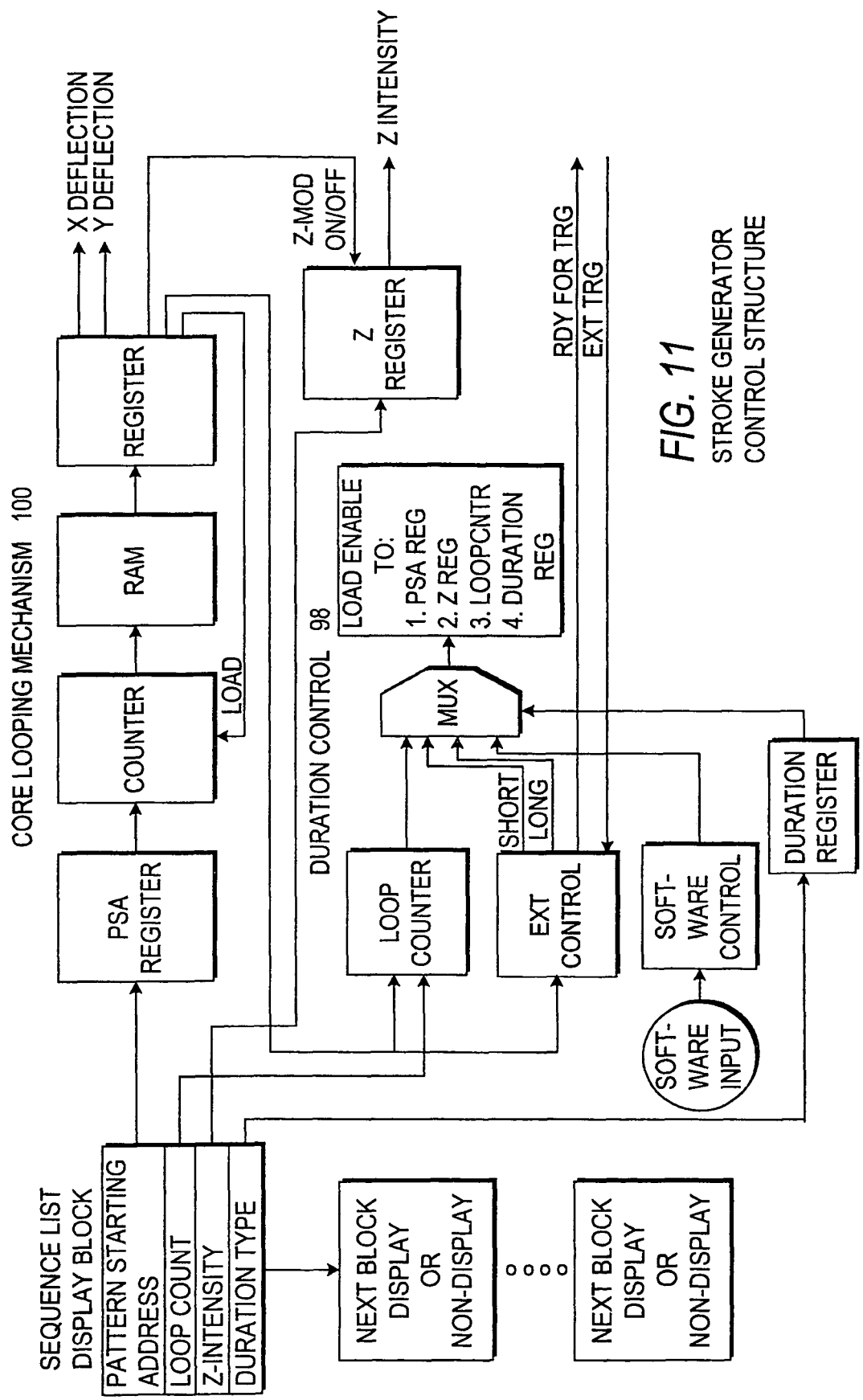
FIG. 11 is a schematic diagram of the control structure of the stroke generator shown in FIG. 10.

A last adjustment to the X, Y and Z data is made by the variable delay section (see FIG. 10B). Here the three data streams are put into three circular queues made up dual port RAM's 184*a*, 184*b*, 184*c* and a counter 186 and three adders 188*a*, 188*b*, 188*c*. Each of three channels 190*a*, 190*b*, 190*c* has an associated register 192*a*, 192*b*, 192*c* that holds the required delay in 2's compliment form. The register store value is added with the common counter output to produce the read address for that channel. The result is a read pointer that is offset from the write pointer thus producing the delay.

There are no restrictions on the assignment of pattern starting addresses to display blocks in the sequence control list. A pattern starting address may appear in as many blocks as is required to produce the desired image.

D. Secondary Video Source (SVS 18)

Figure 12:
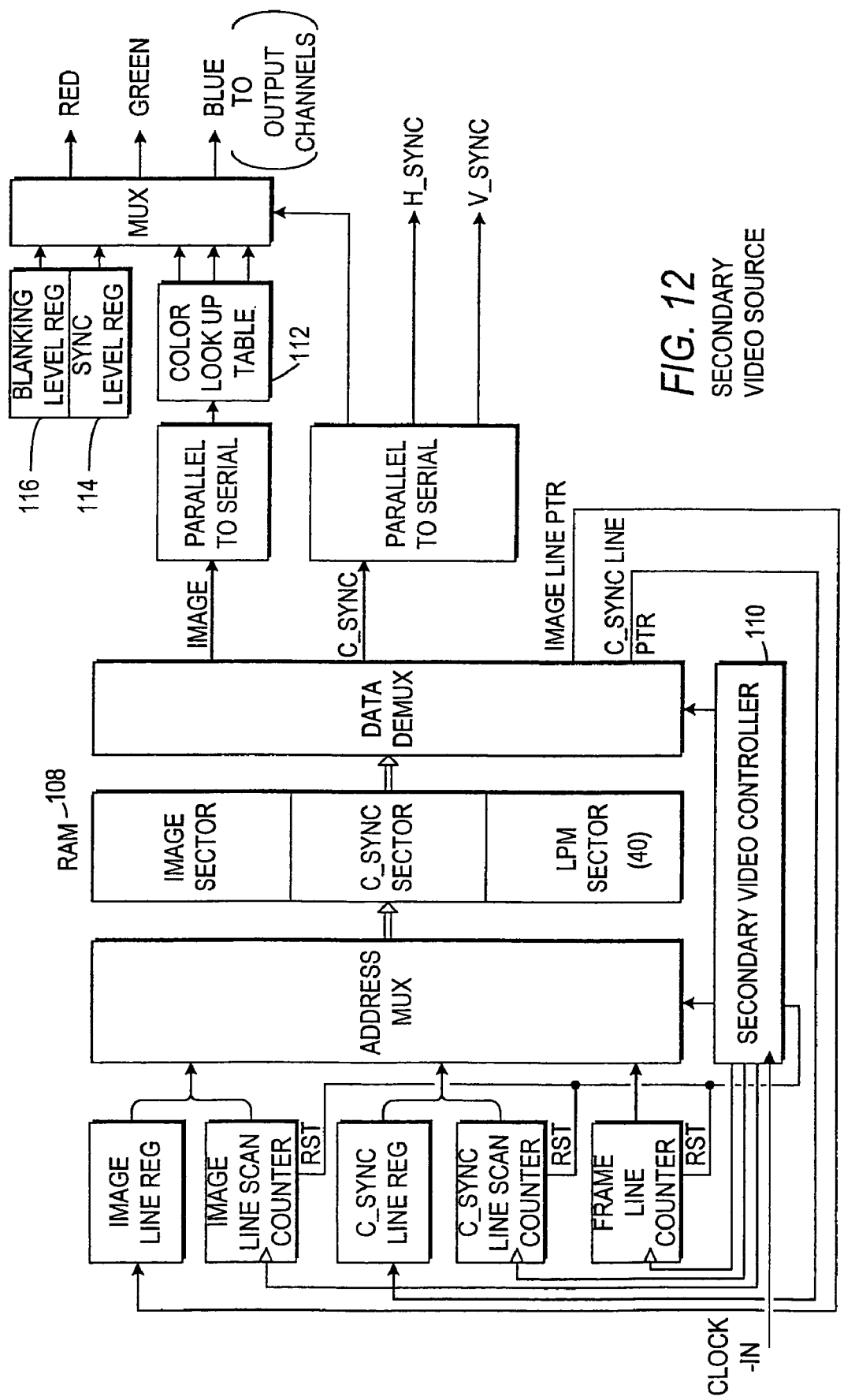
FIG. 12 is a schematic diagram of the secondary video source for use in the video asset in accordance with the invention.

Referring now to FIG. 12, a block diagram of the Secondary Video Source (SVS 18) of the video asset 10 is shown. The SVS 18 generates composite video in any format. Its control structures for generating video are a simplified subset of those employed in the PCV 16. The SVS 18 does not support overlay images, deflection waveforms, user specified pulses or timing markers. The purpose of the SVS 18 is not to replicate the function of the PCV 16, but rather to produce a second video signal of either identical or different format. For example, this second video signal can be used to test multiscan monitors, video switching systems, channel isolation, etc. The SVS 18 runs at a relatively slow clock rate (<about 25 MHz) therefore the multiple memories required for the PCV 16 are not required. A single high speed static memory (128K by 36 in one preferred embodiment) will suffice since there is enough time in a single clock cycle to make multiple, independent reads from the memory. In the single high speed memory 108 will be stored a bit mapped image of 1024 lines (maximum) by 1024 pixels (maximum.) For displays requiring greater than 1024 active lines, the SVS will be loaded with a half size image and will scan each line twice. The remainder of the memory 108 will hold the equivalent to the LPM and C-Sync data of the PCV 16.

For each line in the frame of video being generated, the SVS controller 110 will access a portion of the memory 108 corresponding to the LPM 40. From that portion of the memory 108, the SVS controller 110 will extract the base address of the active image line (if any) and the base address of the composite sync and blanking pattern for the current line. The SVS controller 110 will then make interleaved reads from the memory obtaining image and composite sync data. The video received from the memory is in 8 pixel wide parallel form. The SVS controller 110 will convert it to 1 pixel wide serial form and apply it to the color look up table 112. The sync and blanking control bits when asserted will enable the registers that hold the specified levels for sync and blanking. The color up table output is then merged with the sync and blanking levels from registers 114,116, respectively, and sent to digital to analog converters. The outputs from the digital to analog converters are applied to three +/−3 volt output channels. The sync and blanking outputs are also available as direct digital outputs.

E. Real Time Capture (RTC 22)

The function of the RTC element 22 is to perform one-shot full frame video image capture on either synchronized or deflection (XYZ) video. The ability to capture, and automatically format both forms of video is believed to be a novel and unique aspect of the invention.

Figure 13:
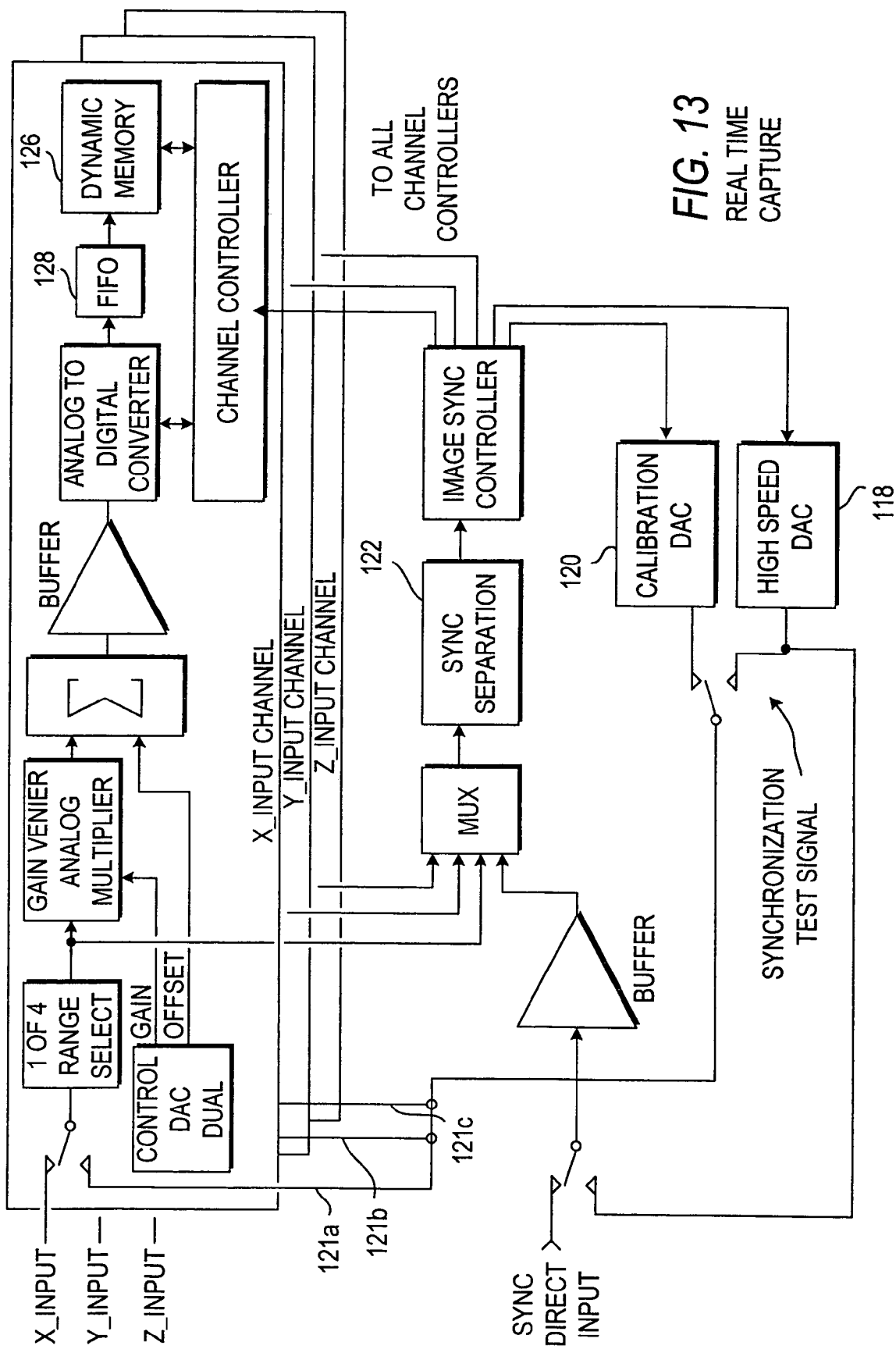
FIG. 13 is a schematic diagram of the real time capture element for use in the video asset in accordance with the invention.

Referring now to FIG. 13, with respect to input channel alignment and calibration, the RTC 22 has three identical channels. The basic form of the analog portion of the input channels is described above. The analog input channel will adjust the offset and peak to peak voltage of the input signal so that it matches the input voltage range of the high speed analog to digital converter 118. In the illustrated embodiment, 12 bit, 40 MHz converters have been used. To ensure proper alignment to the specified input voltage range, a high precision, digital to analog converter 120 provides a calibration voltage to the input channels 121a, 121b, 121c. The test program will specify an input signal voltage range in terms of V-low and V-high. The calibration digital to analog converter 120 will first be set to V-low and applied to the input of the input channel. The gain and offset of the channels 121a, 121b, 121c are adjusted until the analog to digital converter 118 returns a code of 0 hex (the minimum value). The calibration converter 120 is then set to V-high and the input channel is adjusted until the analog to digital converter 118 returns a code of FFF hex (the maximum value). These operations are repeated until no further adjustments are required. This operation is performed on all active input channels.

The RTC can capture video signal in several modes with differing data widths and rates as follows:

1. Three channel operation—for color synchronized video (red, green and blue) and stroke video (X axis deflection, Y axis deflection and Z axis intensity) or deflection driven video (horizontal deflection, vertical deflection and intensity) at 12 bits resolution up to about 20 MHz or 8 bits resolution up to about 40 MHz.

2. Single channel operation—for monochrome video or one of the three channel type signal above at 12 resolution up to about 20 MHz or 8 bits resolution up to about 40 MHz.

3. Single channel operation with paralleled analog to digital converters—12 bits resolution up to about 40 MHz or 8 bits resolution up to about 80 MHz.

The high sampling rate of single channel operation with paralleled analog to digital converters is achieved by connecting two of the three analog to digital converters 118 to the same input channel. The input channel is aligned to the converter to which is normally connected. The response of the other two converters 118 to the applied alignment levels is read by the RTC driver software which then adjusts the reference levels for the two converters 118 until they exhibit the same response as the aligned channel. The three converters 118 are clocked at the same frequency which is equal to, or less than, 40 MHz. However, the phases of the clocks are different. The first clock phase is shifted by 0 degrees, the second by 180 degrees. This produces evenly spaced clock edges (which trigger the sampling) at a combined rate of two times the actual clock frequency.

The captured image samples are stored in three dynamic memories 126 which provide the necessary density. However, the transfer of data into a dynamic memory 126 must be periodically interrupted to permit update of the row address and for refreshing to keep stored data valid. At the same time, the sampling of the input signal cannot be interrupted. To satisfy these two opposing requirements, a set of FIFO memories 128 is used. In a manner similar to that employed in the PCV 16, the data from the analog to digital converters 118 is written into the respective FIFO memory 128 at whatever sampling rate is desired. On the read side of the FIFO memories 128, data is read out of the FIFO memories 128 at the maximum rate supported by the hardware. Data is transferred to the memories 126 until the programmable almost empty flag of the FIFO memory 128 is asserted, at which time, the transfer is halted. When the almost full flag of the FIFO memory 128 is asserted, the transfer of data to the dynamic memories 126 resumes. This arrangement allows the dynamic memories 126 to be refreshed as required without interrupting the video sampling.

Figure 14:
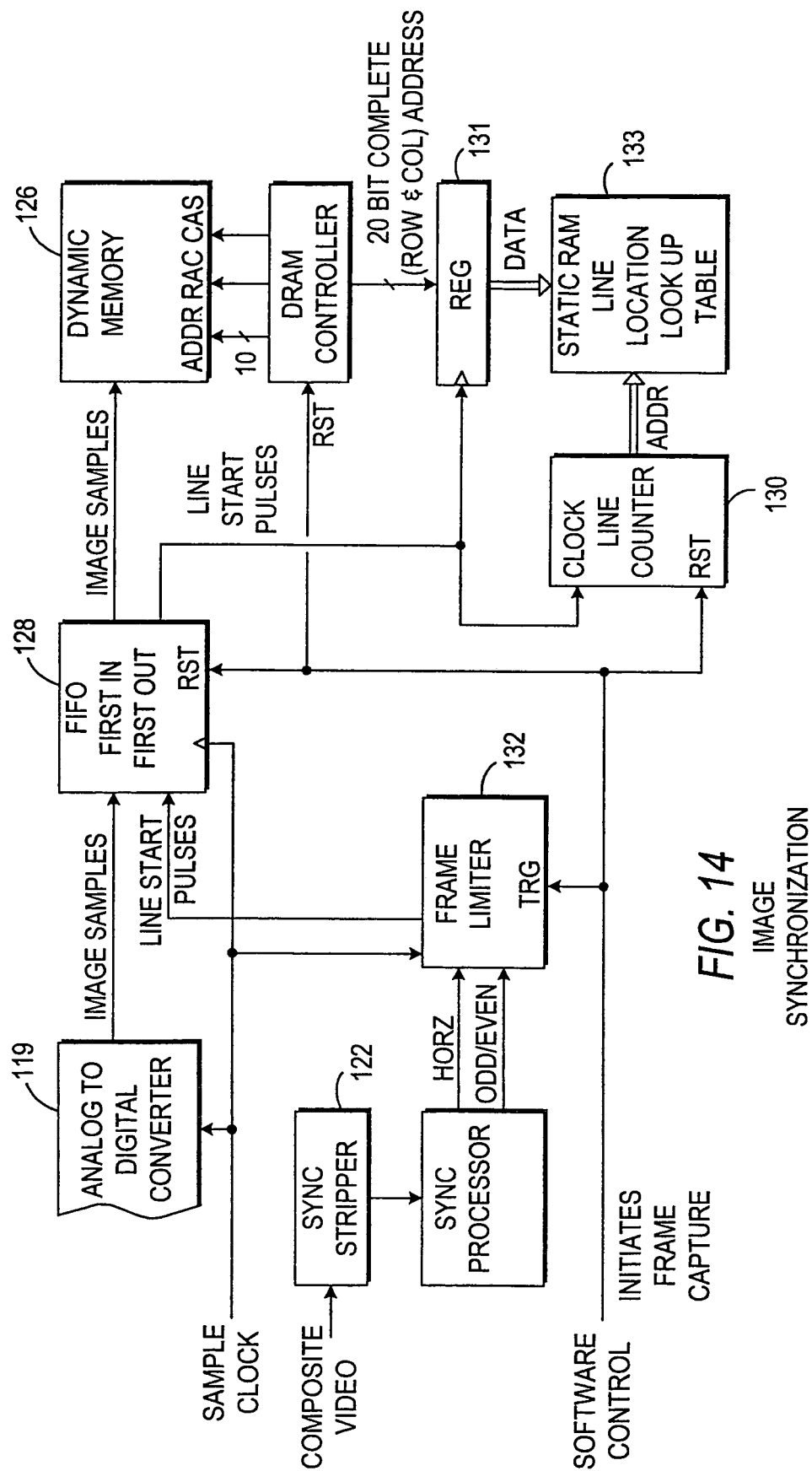
FIG. 14 is a schematic diagram of the image synchronization element for use in the video asset in accordance with the invention.

With respect to image synchronization for synchronized video, as shown in FIG. 13, there is a sync stripper with programmable slice level 122 that separates composite sync timing from the input video. This timing signal is processed by the RTC, namely by a sync processor 129, to produce a local timing reference that is stable and immune to non-severe faults on the input composite sync. From the stable, local reference, horizontal, vertical and field (odd/even) timing are derived. These timing signals are used to produce pointers into the stored sample data. When the capture is taking place, data simply streams into the FIFO memories 128 at the sample rate. At the same time, a line location look up table is being generated. In this table are the starting addresses of each of the video lines stored in the sample memories. FIG. 14 shows how this is accomplished. The horizontal and odd/even timing—from the sync processor discussed above—are processed by a frame limiter 132. The frame limiter 132, when triggered, will output a burst of line start pulses that is coincident with the video frame and contains as many line start pulses as the number of lines in the frame. The line start pulses are synchronized to the sample clock. Each line start pulse occurs at the start of a video line and is written into the FIFO memory 128 along with first sample of that line. On the read side of the FIFO memory 128, there is a line counter 130 that is clocked by the line start pulses.

The dynamic memory 126 which stores the captured image is configured as an array in which each row corresponds to a single line of the input synchronized video, and each column element corresponds to a video sample. At the beginning of a video capture, the line counter 130 is reset and the frame limiter 132 subsequently triggered: This sets the dynamic RAM address to the start of the first row in the array. Each sample written into the memory 126, also advances the column address within the current row. The resultant burst of line start pulses will advance the line counter 130. Each time a line start pulse is received, the dynamic RAM address is set to start of the next row. In addition, the 20 bit dynamic ram address is loaded into a register 131 along with the current state of the line number counter. The register data is transferred into a small static memory 133, the line location look up table, with the line number used as the address and the dynamic memory address as the data. Since there is a one-to-one correspondence between the input video lines and the rows in the dynamic memory 126, the image stored in the RAM is fully formatted. After the capture is completed, the line location look up table 133 will hold the starting address of every stored line. The RTC software will use this line starting address data to efficiently read back the formatted captured image for analysis.

As to image synchronization for stroke video, the memory is also configured as an array with equal number of rows and columns. To capture stroke video the two deflections, X and Y, are sampled and used as row and column addresses into the image memory space and the intensity Z is sampled as the data to be stored at the memory element pointed to by the X and Y deflection samples. This causes the XYZ image to be written into the memory in the same manner as it would be displayed on a XYZ monitor. The RTC software will subsequently read back the captured, fully formatted image for analysis or redisplay. To maximize accuracy, the inputs are calibrated immediately before use.

F. Software Calculation and Control Module (SCCM)

The function of the Software Calculation and Control Module is to interpret operator-supplied instructions and parameters and calculate the necessary data and waveforms to configure the hardware elements of the video asset 10 to perform the desired operations. The SCCM is not a stand-alone module but may be incorporated into the test computer 12. The calculated data is downloaded from the computer where the SCCM is being executed, to the hardware elements of the video asset 10 through the VXI data bus 14. For example, FIGS. 10, 11 and 14 include a box designated Software Control or Controlling Software. The SCCM is a C language program in dynamically linked library (DLL) form accessible by any higher order language.

The software calculation and control module comprises the following major elements:

1. API—programmatic interface between the operator and the video asset 10.
2. Analog Deflection Waveform computation and sequencing.
3. Image Pattern Generation computation and sequencing.
4. Image Acquisition computation and sequencing.
5. Output/Input Circuit alignment.
6. Built-in test—to determine proper operation of the hardware.

The SCCM adds many unique features to the capabilities of the video asset 10 and is an integral part of the functionality thereof despite being a detached element. This unique arrangement allows subsequent function enhancements without altering the hardware of the video asset 10. Each of the elements is discussed separately below.

The function of the API element of the software module is to provide a means through which the operator can supply necessary video generation or acquisition parameters to the video asset 10 and create the desired mode of operation. The API supplies specific software procedures explicit to the generation and acquisition of video signals. The API is knowledgeable about the requirements and limitations of the hardware elements of the video asset 10 and extensively verifies the operator-supplied data for correctness. If the supplied data is in error, a specific error message from the resident software library of over 300+ error messages is returned instructing the operator exactly what was unallowable. Operation of the video asset 10 will not be allowed to proceed unless programming information is valid.

The API configures the proper video asset 10 hardware components to enable the following modes of operation by utilizing the listed parameters:

1. Composite Video generation (B/W and RGB) (Primary and Secondary)
   a. Sync, Blanking, Black and White voltage levels for each of the Red, Green and Blue output channels.
   b. Field Scan direction.
   c. Line Scan direction.
   d. Aspect Ratio.
   e. Interlace Factor.
   f. Frame Rate.
   g. Alternate Frame and Alternate Field.
   h. H Sync parameters (Front porch, sync width, back porch).
   i. V Sync parameters (Front porch, sync width, back porch).
   j. Equalization Pulses (number and width).
   k. Serration Pulses (number and width).
   l. Image content.
2. Stroke Video generation.
   a. Display size (Length by Width in, e.g., inches).
   b. Slew Rate.
   c. Image Resolution.
   d. Minimum, Quiescent and Maximum voltage levels for each of the X, Y and Z deflection channels.
   e. Image content
3. Nonmodulated Raster Video generation.
   a. Minimum, Quiescent and Maximum voltage levels for the X, Y and Z deflection channels.
   b. Field Scan direction.
   c. Line Scan direction.
   d. Aspect Ratio.
   e. Interlace Factor.
   f. Frame Rate.
   g. Alternate Frame and Alternate Field.
   h. H Sync parameters (Front porch, sync width, back porch).
   i. V Sync parameters (Front porch, sync width, back porch).
   j. Image content.
4. Modulated Raster Video generation.
   a. Minimum, Quiescent and Maximum voltage levels for the X, Y and Z deflection channels.
   b. Field Scan direction.
   c. Line Scan direction.
   d. Interlace Factor.
   e. Aspect Ratio.
   f. Interlace Factor.
   g. Frame Rate.
   h. Start of Field angle.
   i. End of Field angle.
   j. Origin offset.
   k. Frame Angle Reference.
   l. Alternate Field and Frame.
   m. H Sync parameters (Front porch, sync width, back porch).
   n. V Sync parameters (Front porch, sync width, back porch).
   o. Image content
5. Composite Video acquisition.
   a. Sample resolution.
   b. Sample Frequency.
   c. Number of sample channels.
   d. Trigger mode.
   e. Synchronization.
   f. Minimum and Maximum voltage levels on each of the 3 input channels.
6. Raster/Stroke Video acquisition.
   a. Sample Resolution.
   b. Sample Frequency.
   c. Trigger Mode.
   d. Synchronization.
   e. Minimum and Maximum voltage levels on each input channel.
7. Acquisition Measurement Modes—The Composite/Raster Video acquisition modes may also specify the following timing or analog measurement modes:
   a. Timing measurements including Sync time, Back porch time, Front porch time, Active time and Line time.
   b. Voltage measurements including Sync voltage, Back porch voltage, Front porch voltage, Most positive voltage and Most negative voltage.

The API unit provides several predefined macros (procedure calls with no parameters) to encompass the programming of many complex modes of operation. Defined macros include (in both generation and acquisition modes): Video standard RS170; Video standard RS343 with 675, 729, 875, 945 and 1023 line rates; and Video standards EGA, VGA, SVGA and XGA. In addition, the operator may make any alteration to macro parameters for nonstandard formats.

With respect to analog deflection waveform computation and sequencing, all analog deflection component values are calculated and constructed within the SCCM. After all operator parameters have been received by the API, the SCCM computes the necessary timing relationships and analog waveform values, digitally constructs the appropriate waveforms and downloads this array data into the appropriate memories within the hardware of the video asset 10. This unique approach enables the video asset 10 to generate any permutation of video format within the video asset 10 specifications.

For composite and raster video, the programmed video format is broken down into separate video lines and identified by the uniqueness (presence or absence) of specific components: vertical sync, vertical blanking, vertical front porch, vertical back porch., equalization pulses, first field (Interlace), and second field (Interlace). Then, each unique line is constructed with the proper video asset 10 binary codes and written to the C-Sync memory. Once all lines have been constructed and written to memory of the video asset 10, a sequence list consisting of the ordering of the unique lines is created and written to the memory of the LPM 40. Additionally, deflection-driven video formats, such as non-modulated and modulated raster patterns, require this software module to calculate individual analog voltages with which to create linear ramp waveforms conforming to the programmed line and field rate for X and Y channel deflections; modulated video also requires similar calculations for the necessary sinusoidal waveforms.

The requirements for stroke video are image pattern specific and are handled within the image pattern generation software module. This module is responsible for constructing the User-Specified Pulses function. There are two modes available: Standard Pulse assembly via operator-supplied parameters and software templates. In standard pulse mode, timing and duration parameters are supplied through the API. According to these parameters, each USP data line is digitally constructed with the proper video asset 10 binary codes and downloaded to the USP memory 36, 38 of the video asset 10. Each operator-specified pulse has the option to be pure or contain software-generated noise values. In the software template mode, the software supplies a standard set of waveforms (tailored to the currently programmed video format), such as missing H sync or missing V sync with or without software-generated noise. This module is also responsible for the assignment and management of available USP hardware slots.

With respect to the Image Pattern Generation module computation and sequencing, all video asset 10 Composite and Raster video image pattern data is calculated within the Image Pattern Generation module of the SCCM. The image content data is written via the VXI bus 14 to the video asset 10 hardware.

The video asset 10 hardware unit has available two sophisticated bit-mapped memories (the PIM 28 and the DOM 30) linked to a hardware-accelerated drawing engine 50 with which to facilitate image pattern creation. Utilizing the drawing engine's strength as an "accelerated rectangle drawing module", the IPG decomposes all operator drawing requests (patterns, characters, vectors, arcs and circles) into constituent rectangles. Utilizing operator-supplied parameters passed from the API, binary data representing starting position, ending position, vector width and color are computed and passed to the video asset 10 hardware unit for processing. Circles and arcs are decomposed into a series of vectors linked at predetermined angles. When vectors are connected end-to-end, the operator has the option of creating a "spinner". A "spinner" is a series of 8 software-calculated rectangles rotated about the midpoint of the end of the vector creating a fully illuminated circle. The visual effect of this method is to smoothly merge vector components such that a distinct transition can not be identified.

The IPG preferably contains a image creation utility unique to automatic test equipment video generation equipment. This advanced software feature is the ability for the operator to define "virtual drawing windows". A "virtual drawing window" is a coordinate space related to the operator defined physical display space, but modified by X and Y axis magnification factors and X and Y axis offset (positioning) factors, These factors are set in units of the physical drawing space (such as 2-times-physical-display-size). The advantage of the "virtual drawing window" concept is that when creating complex repetitive images, the operator only needs to define the image once and manipulate the "virtual window" parameters in order to create that image over and over again at the desired sizes and placements. This eliminates the need for the operator to calculate and specify all of the coordinates necessary to draw each image component at the various sizes and positions. Separate "virtual drawing windows" are definable for the primary image area and the overlay image area.

The IPG supplies the following Composite/Raster video image content facilities ("virtual drawing window" will henceforth be notated as "window"):

1. Vector primitive—color, bar width, rounded ends (see "spinners"), window.
2. Arc primitive—clockwise/counterclockwise rotation, color, bar width, rounded ends, window.
3. Circle primitive—color, bar width, -window.
4. Software macros.
  a. Predefined character macros (A-Z, 0-9, and standard symbology)—color barwidth, character spacing, window.
  b. Standard patterns
    i. Horizontal/Vertical border—color, barwidth, window.
    ii. Crosshatch—XY axis repetition, color, color range, barwidth, window.
    iii. Color Bars—XY axis repetition, color, color range, barwidth, window.
    iv. Dots—XY axis repetition, color, color range, barwidth, window.
    v. Checkerboard—XY axis repetition, color, barwidth, window.
    vi. "Limits" pattern—Segment length, Segment selection, color, barwidth, window.
    vii. Fill—color, window.

The video asset 10 contains an animation feature unique to automatic test equipment video generation equipment. Specifically, within the video asset 10, the DOM memory unit is associated with the image pattern overlay function. All of the above pattern creation facilities are also available to the image overlay unit. The DOM unit 30 provides the video asset 10 with the unique ability to place an overlay anywhere on the video image (i.e., over the video image created by the PIM memory unit 28) by specifying X and Y coordinates in each video frame update.

The IPG software module enhances this functionality with the ability to specify an "overlay rotation list". The "overlay rotation list" is a software-resident circular list in which the operator may specify the sequential display of programmed overlay images. Since the operator is in complete control of the overlay image content, a series of overlays may be designed to simulate an animated display. When the operator specifies overlays to appear on the video display, the "overlay rotation list" can be chosen to manage and program the sequential overlay selections. The "overlay sequence time" (analogous to animation update rate) is a programmable option. This module also supplies the facility to program random movement or linear overlay movement between points. This data is managed within the 6550 element hardware position list.

Color management is provided by this module. After the API receives color parameters from the operator, these values or the requested colors are assigned to the proper look-up table (LUT) within the video asset 10 hardware unit. In addition to specifying specific 24 bit color codes, the color management module provides a software macro which can automatically create a standard Greyscale or Red-Green-Blue color palette. A unique feature of this color management system is to ability to accept color names from a predefined software chart of over 100 standard HTML colors (such as cyan, olive, etc.). This feature eliminates the burden of the operator "guestimating" the proper 24 bit code to achieve the desired color shading.

For the Stroke Video format, the video asset 10 hardware unit supplies a high performance three channel arbitrary function generator with a sophisticated programmatic sequencer. All video asset 10 stroke image deflection patterns are calculated within the Image Pattern Generation module of the SCCM in accordance with the specified slew rate, magnification, placement and aspect ratio parameters. The image content is written via the VXI bus 14 to the video asset 10 hardware unit. This module has two available modes with which to specify image components: Direct Drawing and "Virtual Drawing Windows". Direct drawing mode allows the specification of drawing primitives in units of the physical display size (usually inches). Virtual drawing mode is based upon a 4096 by 4096 dimensionless element grid subdivided into 256 by 256 unity sized "windows". The window coordinate system ranges from 128 to +127 and all operator-specified coordinates must exist within this space. Functionally similar to the "virtual drawing window" concept utilized in the Composite/Raster video mode, the operator has the ability to scale and position this "window" by modifying X and Y axis magnification factors and X and Y axis offset (positioning) factors. These factors are set in units of the unity-sized window (such as 2-times unity-window-size). By specifying a single series of image constructs within the window space, the image may be repetitively scaled and positioned by merely varying the four window parameters. Once all sizing and positioning parameters have been factored in, this software module calculates the digital representation of each voltage point on the image vectors and writes the data to the hardware of the video asset 10. Continuity between illuminated vectors is maintained by automatic software calculation and insertion of non-illuminated vectors.

The hardware of the video asset 10 supplies a programmatic sequencer which provides the ability to randomly assemble and display image components creating intricate and animated displays. Each image display duration may be looped for a finite time, looped until external trigger or manual intervention or looped indefinitely. A set of operational codes provide commands to: start a pattern, stop a pattern, jump to an address, jump to a subroutine, loop back, branch in real time, return from a subroutine, and increment or specify image pattern offset. This software module is responsible for the management of the sequential programming.

The IPG supplies the following stroke video image content facilities:

1. Vector primitive—intensity, window.
2. Arc primitive—clockwise/counterclockwise rotation, intensity, window.
3. Circle primitive—intensity, window.
4. Software macros including predefined character macros (A-Z, 0-9, and standard symbology)—color barwidth, character spacing, window.

The Image Acquisition computation and sequencing module is responsible for configuring the video asset's 10 three channel digitizer according to parameters received by the API. Once acquisition has completed, the operations performed depend upon the operational mode. The operator may ask for specific voltage and timing measurements or a file dump of the captured image. In either case, this software module interrogates a list of starting line addresses created in the video asset 10 hardware unit and locates desired video lines. For measurements, software algorithms are executed which determine the location of all components of the video line and perform the desired calculation. For image dumps, the entire frame data is sequentially downloaded, reconstructed and placed into an external binary file for examination.

With respect to the output/input circuit alignment, the video asset 10 hardware unit has dynamically configurable input and output analog circuits. After analog parameters have been received by the API, it is the responsibility of this software module to configure and interactively align the video asset 10 hardware unit. Through a controlled sequence of digital switching, offset voltage alignment and analog gain adjustment, a configuration of high accuracy is produced.

The built-in test module is responsible for determining the operational readiness of the video asset 10 hardware unit. By exercising an extensive list of memory tests, register tests, alignment tests, generation and acquisition tests, the accuracy of each hardware element is verified.

Accordingly, in a method for producing a static video signal in accordance with the invention, e.g., for delivery to a unit under test, a prime image memory (PIM) holding a main bit mapped image is provided, sync and blanking patterns for lines of the video signal being generated are held in a composite sync memory (C-Sync), and a series of arbitrary bit line patterns defined in a test program are held in two user specified pulse memories (USPs). Data blocks are arranged in a circular queue in a line parameter memory (LPM), each data block corresponding to a complete video line and containing pointers to specific entries in the PIM, the C-Sync and the USPs and a flag indicative of scan direction. Production of the video signal is initiated by reading the LPM and extracting the pointers from the data blocks for a first line of the video signal being produced. Bits from the PIM, C-Sync and USPs are obtained based on the extracted pointers and combined to thereby form the video signal.

The length of the first line of video signal being produced is monitored to determine when the first line of video is complete, and then production of the video signal is continued by reading the LPM to extract the pointers from the data blocks for additional lines of the video signal being produced, obtaining bits from the PIM, C-Sync and USPs based on the extracted pointers and monitoring the length of the additional lines to determine when each additional line of video is complete.

The formation of the video signal can be controlled by regulating the transfer of the combined video data in order to provide uninterrupted video output, for example, by providing a first-in-first-out (FIFO) memory for receiving the combined bits, storing the combined bits in the FIFO memory for a period of time until the FIFO memory is almost full, then removing the stored combined bits from the FIFO memory such that the FIFO memory is almost empty, and repeating the storing and removing steps.

In some embodiments, a stored dynamic image is overlaid onto the static video signal being produced. This may be achieved by providing a vector store memory (VSM) with entries each holding a line offset, pixel offset, overlay image pointer and priority for the dynamic image, reading each entry in the VSM and comparing the overlay line offset to a pending line of the primary image, and selectively activating the overlay image based on the relation between the overlay line offset and the pending line of primary image.

A deflection waveform may be imposed on the lines of video produced to thereby form a raster video signal, e.g., from a multi-format deflection waveform generator. In this case, data blocks are held in a scan memory including sine and cosine of angle and magnitude data, and the application of the data blocks is controlled to thereby enable either modulated raster video signal or a non-modulated raster video signal to be produced. If the data blocks of sine and cosine of the angle are applied, a modulated raster video signal is produced. If the data blocks of magnitude data are applied, a non-modulated raster video signal is produced.

Also disclosed above is a method for drawing an image on a screen in which three streams of data are created by directing a preload value to a counter having memory addresses and using the memory addresses to obtained data from the memory, each stream of data is converted to an analog signal by means of a respective digital to analog converter, and the analog signals are directed to output channels. The three streams of data preferably represent X-deflection data, Y-deflection data and Z-intensity data. Also, a fourth stream of data may be created by the value being directed to the counter, in which case, the addresses being provided by the counter to the memory are controlled based on the fourth stream of data.

In preferred embodiments, the image is a pattern and the value is determinative of the pattern. The pattern being drawn can be varied by changing the value being directed to the counter. The duration for which each of the values is directed to the counter may also be varied and any variations controlled to thereby enable the creation of different pattern sequences.

With the video asset in accordance with the invention including user-programmable signal generators, the user has, for example, the ability to generate non-standard H/V sync/blanking timing signals relative to the generated video signal, the ability to generate user-defined pixel strobes for digital images, the ability to generate arbitrary quad-state analog signals and the ability to generate four ancillary digital signals in stroke video mode. Particular benefits of the presence of user-programmable signal generators synchronized to the primary video output signals (described above in connection with USP's 36 and 38 and memory 92) include the need for less supporting equipment, the simplicity of signal interfacing made possible by a reduction in supporting equipment, the ability to support a larger group of standard and non-standard video equipment in comparison to single-function video instruments and the ability to readily integrate the video functions into a larger test setup.

Above, some preferred embodiments of the invention have been described, and it is obvious to a person skilled in the art that numerous modifications can be made to these embodiments within the scope of the inventive idea defined in the accompanying patent claims. As such, the examples provided above are not meant to be exclusive. Many other variations of the present invention would be obvious to those skilled in the art, and are contemplated to be within the scope of the appended claims.

The invention claimed is:

1. A video processing arrangement, comprising:
a host computer including a monitor;
a video asset coupled to said computer for generating video signals; and
an interface for connecting said video asset to said computer to enable the display of the video signals on said monitor,
said video asset being a single instrument adapted for insertion into a single slot of said host computer and comprising a plurality of primary elements including:
a primary composite video module for producing different types of a primary video signal and outputting the primary video signal via output channels,
a stroke generator module for generating a stroke XYZ video signal and outputting the stroke video signal via output channels, and
a secondary video source module for producing a secondary composite video signal and outputting the secondary composite video signal via output channels, said secondary video source module being arranged to produce the secondary composite video signal in an identical or different format than the primary video signal and different than the primary video signal.

2. The arrangement of claim 1, wherein said primary elements of said video asset further comprise a real time capture module for capturing video signals in a plurality of different modes.

3. The arrangement of claim 2, wherein video asset further comprises a common distributed time base module for generating and distributing clock signals to all of said primary elements.

4. The arrangement of claim 3, further comprising a serial data interface for connecting each of said primary elements together and to said interface.

5. The arrangement of claim 2, further comprising a serial data interface for connecting each of said primary elements together and to said interface.

6. The arrangement of claim 2, wherein video asset further comprises a common distributed time base module for generating and distributing clock signals to all of said primary elements.

7. The arrangement of claim 2, further comprising a serial data interface for connecting each of said primary elements together and to said interface.

8. The arrangement of claim 1, wherein video asset further comprises a common distributed time base module for generating and distributing clock signals to all of said primary elements.

9. The arrangement of claim 8, further comprising a serial data interface for connecting each of said primary elements together and to said interface.

10. The arrangement of claim 1, further comprising a serial data interface for connecting each of said primary elements together and to said interface.

11. The arrangement of claim 1, wherein said interface is a VXI interface, a PXI interface, a PCI interface, or a LXI interface.

12. The arrangement of claim 2, wherein said real time capture module is arranged to read back a captured, fully formatted image for analysis or redisplay.

13. A video processing arrangement, comprising:
a host computer including a monitor;
a video asset coupled to said computer for generating video signals; and an interface for connecting said video asset to said computer to enable the display of the video signals on said monitor, said video asset being a single instrument adapted for insertion into a single slot of said host computer and comprising a plurality of primary elements including a primary composite video module for producing different types of a primary video signal and outputting the primary video signal via output channels, and a secondary video source module for producing a secondary composite video signal and outputting the secondary composite video signal via output channels, said secondary video source module being arranged to produce the secondary composite video signal in an identical or different format than the primary video signal and different than the primary video signal.

14. The arrangement of claim 13, wherein said primary elements of said video asset further comprise a real time capture module for capturing video signals in a plurality of different modes.

15. The arrangement of claim 14, wherein video asset further comprises a common distributed time base module for generating and distributing clock signals to all of said primary elements.

16. The arrangement of claim 15, further comprising a serial data interface for connecting each of said primary elements together and to said interface.

17. The arrangement of claim 14, further comprising a serial data interface for connecting each of said primary elements together and to said interface.

18. The arrangement of claim 13, wherein video asset further comprises a common distributed time base module for generating and distributing clock signals to all of said primary elements.

19. The arrangement of claim 13, further comprising a serial data interface for connecting each of said primary elements together and to said interface.

20. The arrangement of claim 19, wherein video asset further comprises a common distributed time base module for generating and distributing clock signals to all of said primary elements.

21. The arrangement of claim 13, wherein said interface is a VXI interface, a PXI interface, a PCI interface, or a LXI interface.

22. The arrangement of claim 14, wherein said real time capture module is arranged to read back a captured, fully formatted image for analysis or redisplay.

23. A video processing arrangement, comprising:
a host computer including a monitor;
a video asset coupled to said computer for generating video signals; and
an interface for connecting said video asset to said computer to enable the display of the video signals on said monitor,
said video asset being a single instrument adapted for insertion into a single slot of said host computer and comprising a plurality of primary elements including:
a primary composite video module for producing different types of a primary video signal and outputting the primary video signal via output channels, and
a real time capture module for capturing video signals in a plurality of different modes, said real time capture module including a plurality of identical input channels, each of said input channels being arranged to receive and format a respective input component of the same video signals.

24. The arrangement of claim 23, wherein video asset further comprises a common distributed time base module for generating and distributing clock signals to all of said primary elements.

25. The arrangement of claim 24, further comprising a serial data interface for connecting each of said primary elements together and to said interface.

26. The arrangement of claim 23, further comprising a serial data interface for connecting each of said primary elements together and to said interface.

27. The arrangement of claim 23, wherein said interface is a VXI interface, a PXI interface, a PCI interface, or a LXI interface.

28. The arrangement of claim 23, wherein said primary elements of said video asset further include a secondary video source module that produces a secondary composite video signal and outputs the secondary composite video signal via output channels, said secondary video source module being arranged to produce the secondary composite video signal in an identical or different format than the primary video signal and different than the primary video signal.

29. The arrangement of claim 23, wherein said real time capture module is arranged to capture synchronized and deflection (XYZ) video images.

30. The arrangement of claim 23, wherein said real time capture module is arranged to read back a captured, fully formatted image for analysis or redisplay.

31. A video processing arrangement, comprising:
a host computer including a monitor;
a video asset coupled to said computer for generating video signals; and
an interface for connecting said video asset to said computer to enable the display of the video signals on said monitor,
said video asset being a single instrument adapted for insertion into a single slot of said host computer and comprising a plurality of primary elements including:
a stroke generator module for generating a stroke XYZ video signal and outputting the stroke video signal via output channels and
a real time capture module for capturing video signals in a plurality of different modes, said real time capture module including a plurality of identical input channels, each of said input channels being arranged to receive and format a respective input component of the same video signals.

32. The arrangement of claim 31, wherein video asset further comprises a common distributed time base module for generating and distributing clock signals to all of said primary elements.

33. The arrangement of claim 32, further comprising a serial data interface for connecting each of said primary elements together and to said interface.

34. The arrangement of claim 31, further comprising a serial data interface for connecting each of said primary elements together and to said interface.

35. The arrangement of claim 31, wherein said interface is a VXI interface, a PXI interface, a PCI interface, or a LXI interface.

36. The arrangement of claim 31, wherein said primary elements of said video asset further include a primary composite video module that produces different types of a primary video signal and outputs the primary video signal via output channels.

37. The arrangement of claim 36, wherein said primary elements of said video asset further include a secondary video source module that produces a secondary composite video signal and outputs the secondary composite video signal via output channels, said secondary video source module being arranged to produce the secondary composite video signal in an identical or different format than the primary video signal and different than the primary video signal.

38. The arrangement of claim 31, wherein said real time capture module is arranged to capture synchronized and deflection (XYZ) video images.

39. The arrangement of claim 31, wherein said real time capture module is arranged to read back a captured, fully formatted image for analysis or redisplay.

* * * * *